(12) United States Patent
Sasaki

(10) Patent No.: US 10,503,364 B2
(45) Date of Patent: Dec. 10, 2019

(54) INFORMATION PROCESSING APPARATUS AND INFORMATION PROCESSING METHOD

(71) Applicant: SONY CORPORATION, Tokyo (JP)

(72) Inventor: Motoki Sasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/779,221

(22) PCT Filed: Sep. 21, 2016

(86) PCT No.: PCT/JP2016/077797
§ 371 (c)(1),
(2) Date: May 25, 2018

(87) PCT Pub. No.: WO2017/104206
PCT Pub. Date: Jun. 22, 2017

(65) Prior Publication Data
US 2018/0348968 A1 Dec. 6, 2018

(30) Foreign Application Priority Data
Dec. 15, 2015 (JP) ................. 2015-243698

(51) Int. Cl.
*G06F 3/0482* (2013.01)
*G08C 17/00* (2006.01)
(Continued)

(52) U.S. Cl.
CPC ........ *G06F 3/0482* (2013.01); *G06F 3/04845* (2013.01); *G06F 3/04847* (2013.01);
(Continued)

(58) Field of Classification Search
CPC ..................................... G06F 3/0482
(Continued)

(56) References Cited

U.S. PATENT DOCUMENTS 6,801,229 B1 * 10/2004 Tinkler ............... G06F 16/9038
715/853
8,015,508 B2 * 9/2011 Kim ..................... G06F 3/0346
345/163
(Continued)

FOREIGN PATENT DOCUMENTS

| JP | 2002-016990 A | 1/2002 |
| JP | 2007-181068 A | 7/2007 |

(Continued)

OTHER PUBLICATIONS

International Search Report and Written Opinion of PCT Application No. PCT/JP2016/077797, dated Oct. 25, 2016, 09 pages of ISRWO.

*Primary Examiner* — William D Titcomb
(74) *Attorney, Agent, or Firm* — Chip Law Group

(57) ABSTRACT

Provided is a user interface easy to customize. An information processing apparatus is an information processing apparatus including a control unit. The control unit included in this information processing apparatus displays an operation screen on a display surface of a display unit in a case where an operation of editing a plurality of operation elements placed on the operation screen is performed to place each operation element on an edit screen. In addition, while displaying the operation screen on the display surface of the display unit, this control unit displays a part of an image indicating a placement location on the edit screen of each operation element on the display surface.

13 Claims, 20 Drawing Sheets

(51) Int. Cl.
*G06F 3/0484* (2013.01)
*H04L 12/28* (2006.01)
*G06F 3/0488* (2013.01)

(52) U.S. Cl.
CPC ............ *G08C 17/00* (2013.01); *H04L 12/282* (2013.01); *G06F 3/0488* (2013.01); *G08C 2201/30* (2013.01); *G08C 2201/92* (2013.01); *H04L 2012/285* (2013.01); *H04L 2012/2849* (2013.01)

(58) Field of Classification Search
USPC ........................................................ 715/765
See application file for complete search history.

(56) References Cited

U.S. PATENT DOCUMENTS

| | | | | |
|---|---|---|---|---|
| 8,245,143 | B2* | 8/2012 | Yach | G06F 1/1626 |
| | | | | 715/744 |
| 9,197,917 | B2* | 11/2015 | Matsubara | H04H 60/80 |
| 2007/0146160 | A1 | 6/2007 | Takeshita | |
| 2010/0088639 | A1* | 4/2010 | Yach | G06F 1/1626 |
| | | | | 715/825 |
| 2014/0149903 | A1* | 5/2014 | Ahn | G06F 3/0488 |
| | | | | 715/765 |
| 2014/0327528 | A1 | 11/2014 | Matsumoto | |
| 2015/0205472 | A1* | 7/2015 | Han | G06F 3/0481 |
| | | | | 715/765 |
| 2015/0220257 | A1* | 8/2015 | Moore | G06F 3/04845 |
| | | | | 715/765 |
| 2015/0309700 | A1* | 10/2015 | Li | G06F 16/2228 |
| | | | | 715/765 |
| 2015/0339018 | A1* | 11/2015 | Moon | G06F 3/0484 |
| | | | | 715/765 |
| 2016/0110035 | A1* | 4/2016 | Kim | G06F 3/0488 |
| | | | | 715/765 |

FOREIGN PATENT DOCUMENTS

| | | |
|---|---|---|
| JP | 2014-220805 A | 11/2014 |
| JP | 2015-109116 A | 6/2015 |
| JP | 2015-126270 A | 7/2015 |

* cited by examiner

FIG. 3
DISPLAY EXAMPLES OF REMOTE CONTROLLER SCREENS FOR LIGHT
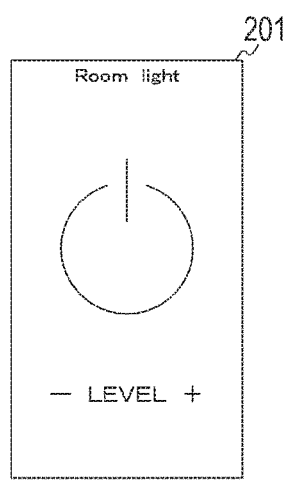
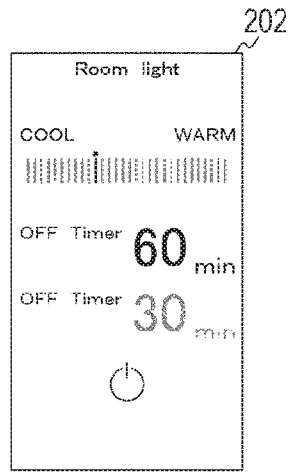
DISPLAY EXAMPLES OF REMOTE CONTROLLER SCREENS FOR AIR CONDITIONER
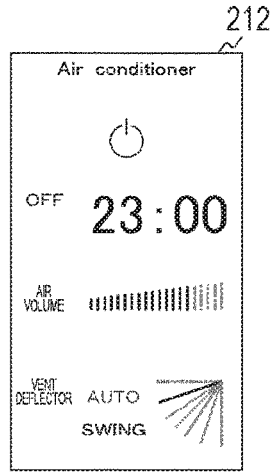
DISPLAY EXAMPLES OF REMOTE CONTROLLER SCREENS FOR TELEVISION
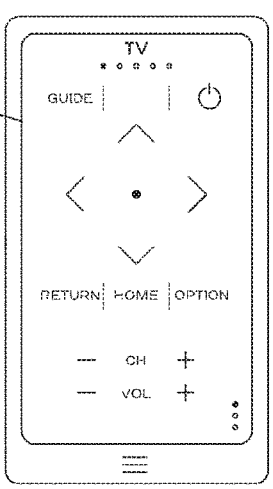
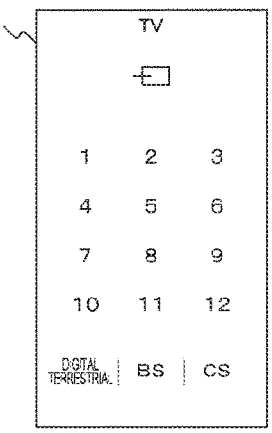
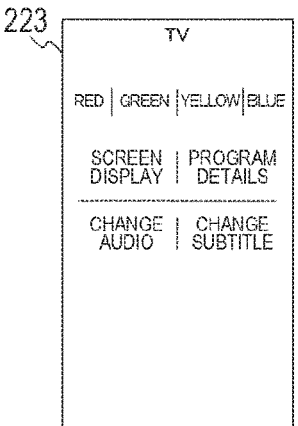

FIG. 5
DISPLAY TRANSITION EXAMPLES IN CASE WHERE CUSTOM REMOTE CONTROLLER SCREEN IS CUSTOMIZED
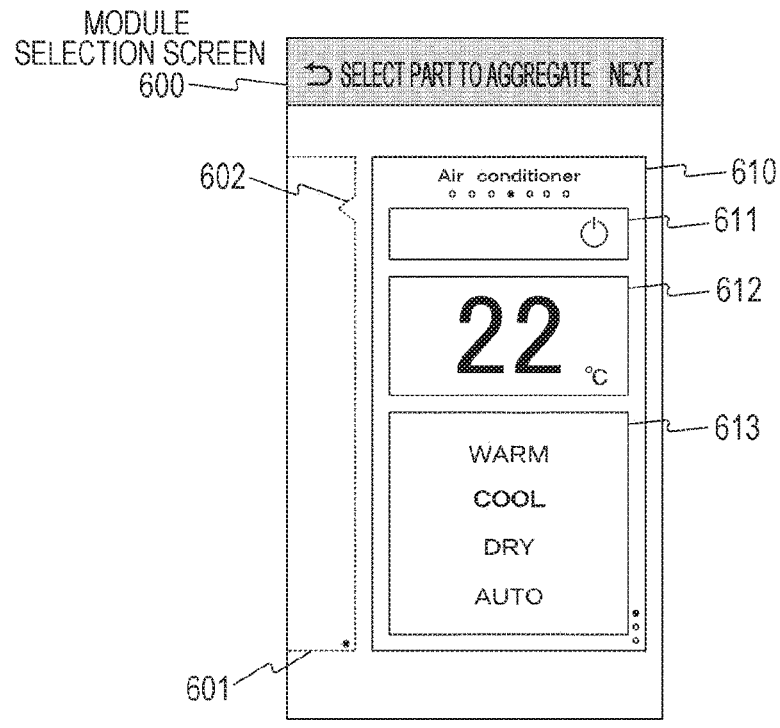
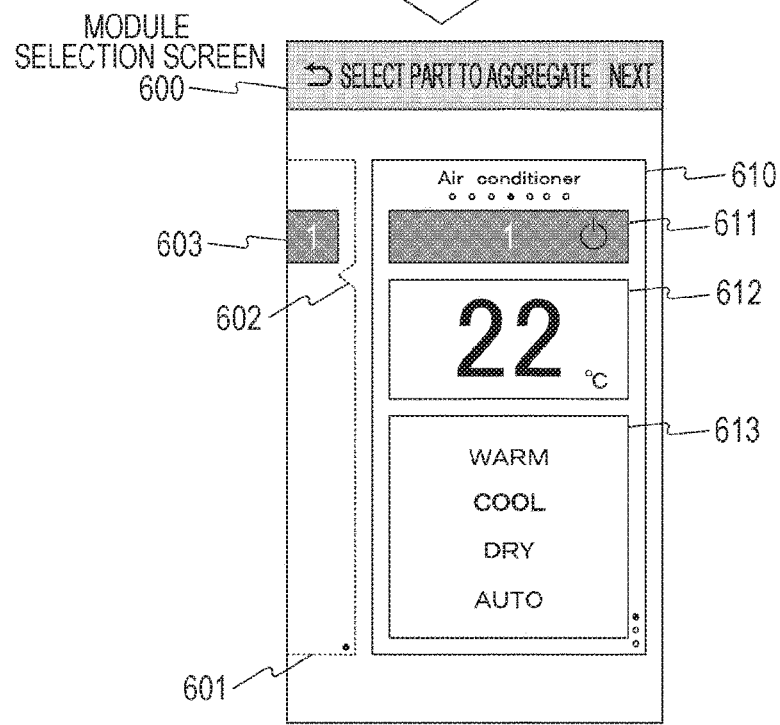

FIG. 6
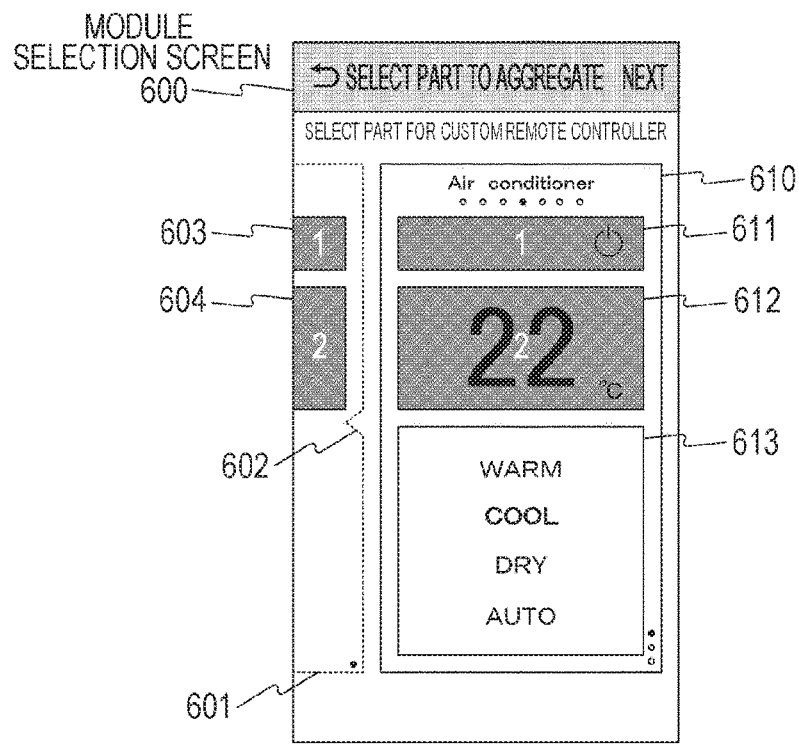
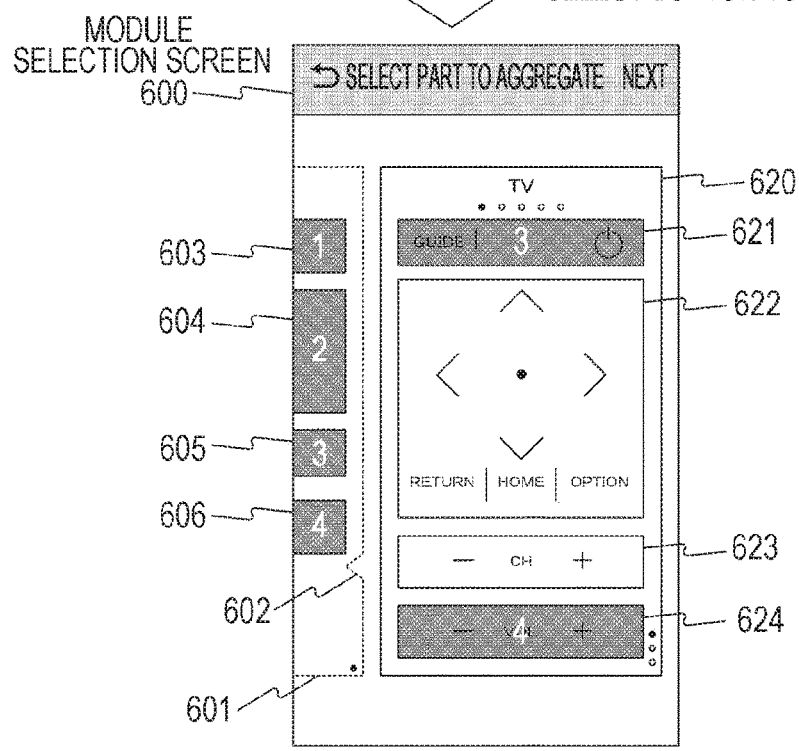

DISPLAY EXAMPLE OF CUSTOM REMOTE CONTROLLER SCREEN

FIG. 11 — DISPLAY TRANSITION EXAMPLES IN CASE WHERE CUSTOM REMOTE CONTROLLER SCREEN IS CUSTOMIZED

FIG. 13
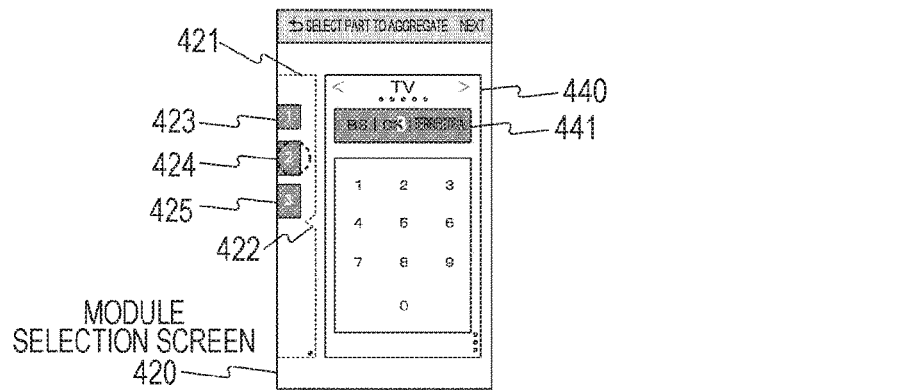
RELEASE SELECTION BY PRESSING UNNECESSARY BUTTON (ALSO POSSIBLE BY PRESSING BUTTON IN SELECTED STATE ON LEFT SIDE)
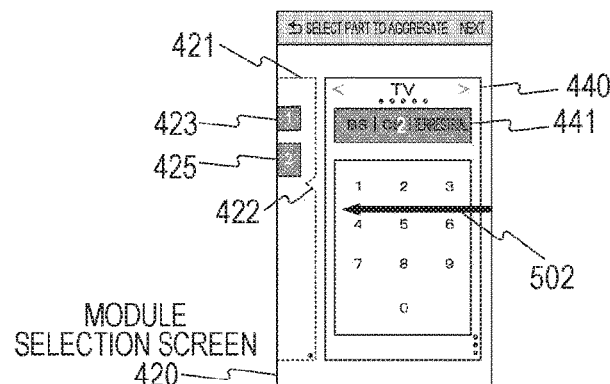
MOVE REMOTE CONTROLLER SCREEN BY HORIZONTAL SWIPE OPERATION (MOVE FROM TELEVISION REMOTE CONTROLLER SCREEN TO AIR CONDITIONER REMOTE CONTROLLER SCREEN)
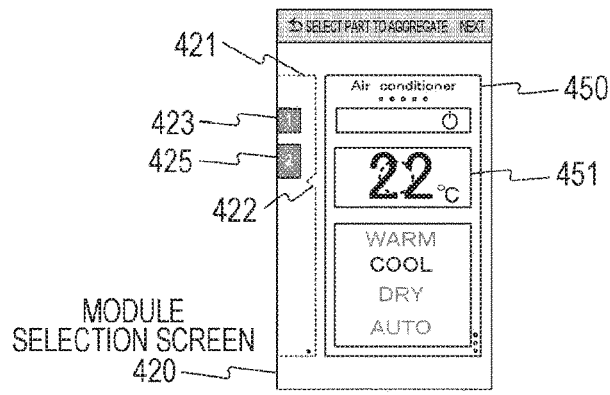
SELECT BUTTON TO USE

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/077797 filed on Sep. 21, 2016 which claims priority benefit of Japanese Patent Application No. JP 2015-243698 filed in the Japan Patent Office on Dec. 15, 2015. Each of the above-referenced applications is hereby incorporated herein by reference in its entirety.

TECHNICAL FIELD

The present technology relates to an information processing apparatus. In more detail, the present technology relates to an information processing apparatus, an information processing method, and a program for causing a computer to execute the method which display an image.

BACKGROUND ART

Conventionally, there are information processing apparatuses capable of displaying information regarding other electronic instruments and performing operations related to other electronic instruments. Examples thereof include remote controllers attached to electric home appliances and audio visual (AV) instruments. Incidentally, electric home appliances and AV instruments refer to electronic instruments such as a digital versatile disc (DVD) recorder, a television, an air conditioner, a lighting fixture, and a music player.

In addition, for example, there has been proposed a control apparatus capable of integrating functions of remote controllers of a plurality of electronic instruments into one remote controller (for example, refer to Patent Document 1). In this control apparatus, operation screens displaying operation buttons of respective electronic instruments can be grouped for each electronic instrument and an operation screen for a desired electronic instrument can be displayed by a contact operation on an index portion.

CITATION LIST

Patent Document

Patent Document 1: Japanese Patent Application Laid-Open No. 2002-16990

SUMMARY OF THE INVENTION

Problems to be Solved by the Invention

According to the conventional technology described above, since functions of remote controllers of a plurality of electronic instruments can be integrated into one remote controller, it is not necessary to own a plurality of remote controllers. In addition, it is possible to display an operation screen for a desired electronic instrument by a user operation.

Here, for example, operation buttons of an electronic instrument include frequently used operation buttons and rarely used operation buttons in many cases. It is also assumed that frequently used operation buttons extend over a plurality of electronic instruments. Therefore, it is conceivable to customize the operation screen displaying the operation buttons of each electronic instrument according to the user's preference. In this case, it is important to provide a user interface that is easy to customize.

The present technology has been conceived in view of such a situation and aims to provide a user interface that is easy to customize.

Solutions to Problems

The present technology has been made to eliminate the above-described disadvantages and a first aspect thereof is an information processing apparatus, an information processing method therefor, and a program for causing a computer to execute the method, the information processing apparatus including a control unit that, in a case where an operation of editing a plurality of operation elements placed on an operation screen is performed to place each operation element on an edit screen, displays the operation screen on a display surface of a display unit and also displays a part of an image indicating a placement location on the edit screen of each operation element on the display surface. This has effectiveness of displaying the operation screen on the display surface of the display unit and also displaying a part of the image indicating the placement location on the edit screen of each operation element on the display surface.

In addition, in this first aspect, the control unit may display the plurality of operation elements placed on the operation screen in sequence in a predetermined direction and display a part of the image indicating the placement location in a display region adjacent to the operation screen in an orthogonal direction orthogonal to the predetermined direction. This has effectiveness of displaying the plurality of operation elements placed on the operation screen in sequence in the predetermined direction and displaying a part of the image indicating the placement location in the display region adjacent to the operation screen in the orthogonal direction.

In addition, in this first aspect, the control unit may adjust a size in the predetermined direction of the image indicating the placement location displayed in the display region to the same size or substantially the same size as a size in the predetermined direction of an operation element corresponding to the image indicating the placement location, from among the plurality of operation elements placed on the operation screen. This has effectiveness of adjusting the size in the predetermined direction of the image indicating the placement location displayed in the display region to the same size or substantially the same size as the size in the predetermined direction of an operation element corresponding to this image indicating the placement location placed on the operation screen.

In addition, in this first aspect, the control unit may display an image indicating the degree of occupancy of each operation element on the edit screen in the predetermined direction as a part of the image indicating the placement location. This has effectiveness of displaying the image indicating the degree of occupancy of each operation element on the edit screen in the predetermined direction.

In addition, in this first aspect, when receiving selection operations to select the operation elements placed on the operation screen displayed on the display surface, the control unit may display parts of images indicating the placement locations of the selected operation elements in sequence on the display surface in accordance with a selection order. This has effectiveness of displaying, when the selection operations to select the operation elements placed on the operation screen displayed on the display surface are received, parts of the images indicating the placement locations of these selected operation elements in sequence on the display surface in accordance with a selection order.

In addition, in this first aspect, the control unit may display a mark representing a position where a part of the image indicating the placement location is to be placed next in the display region displaying a part of the image indicating the placement location on the display surface. This has effectiveness of displaying a mark representing a position where a part of the image indicating the placement location is placed next in the display region displaying a part of the image indicating the placement location on the display surface.

In addition, in this first aspect, the control unit may assign the same identification information to a part of the image indicating the placement location displayed on the display surface and an operation element corresponding to the image indicating the placement location among the plurality of operation elements placed on the operation screen displayed on the display surface. This has effectiveness of assigning the same identification information to a part of the image indicating the placement location displayed on the display surface and an operation element corresponding to this image indicating the placement location placed on the operation screen displayed on the display surface.

In addition, in the first aspect, the control unit may delete or replace each operation element on the edit screen on the basis of a deletion operation or a replacement operation for a part of the image indicating the placement location displayed on the display surface. This has effectiveness of deleting or replacing each operation element on the edit screen on the basis of the deletion operation or the replacement operation for a part of the image indicating the placement location displayed on the display surface.

In addition, in this first aspect, the control unit may place an operation element selected on the basis of a user operation on the edit screen, from among the plurality of operation elements placed on the operation screen. This has effectiveness of placing an operation element selected on the basis of a user operation on the edit screen, from among the plurality of operation elements placed on the operation screen.

In addition, in this first aspect, the operation screen may include a plurality of operation screens for operating another electronic instrument using wireless communication on which the operation elements are placed, and the control unit may display at least one operation screen on the display surface on the basis of a user operation, from among the plurality of operation screens. This has effectiveness of displaying at least one operation screen out of the plurality of operation screens on the display surface on the basis of a user operation.

In addition, in this first aspect, the information processing apparatus may be configured as an information processing apparatus including the display unit whose display surface has a size equal to or smaller than a predetermined size, or an information processing apparatus of a size that allows a user to hold the entire apparatus with one hand. This has effectiveness of using an information processing apparatus including the display unit whose display surface has a size equal to or smaller than a predetermined size, or an information processing apparatus of a size that allows a user to hold the entire apparatus with one hand.

Effects of the Invention

According to the present technology, an excellent effect that it is possible to provide a user interface easy to customize can be exerted. Note that the effects described herein are not necessarily limited and any effects described in the present disclosure may be applied.

BRIEF DESCRIPTION OF DRAWINGS

FIG. 3 is a diagram illustrating display examples of a remote controller screen displayed on a display unit 110 of the information processing apparatus 100 according to the embodiment of the present technology.

FIG. 5 is a diagram illustrating a display transition example of the display unit 110 in a case where a custom remote controller screen is customized using the information processing apparatus 100 according to the embodiment of the present technology.

FIG. 6 is a diagram illustrating the display transition example of the display unit 110 in a case where the custom remote controller screen is customized using the information processing apparatus 100 according to the embodiment of the present technology.

FIG. 13 is a diagram illustrating a display transition example of the display unit 110 in a case where the custom remote controller screen is customized using the information processing apparatus 100 according to the embodiment of the present technology.

MODE FOR CARRYING OUT THE INVENTION

Modes for carrying out the present technology (hereinafter, referred to as embodiments) will be described below. The description will be given in the following order.

1. Embodiment (example of displaying a remote controller screen for an instrument and a preview image display region on a module selection screen)

1. Embodiment

[Configuration Example of Information Processing Apparatus]

Figure 1:
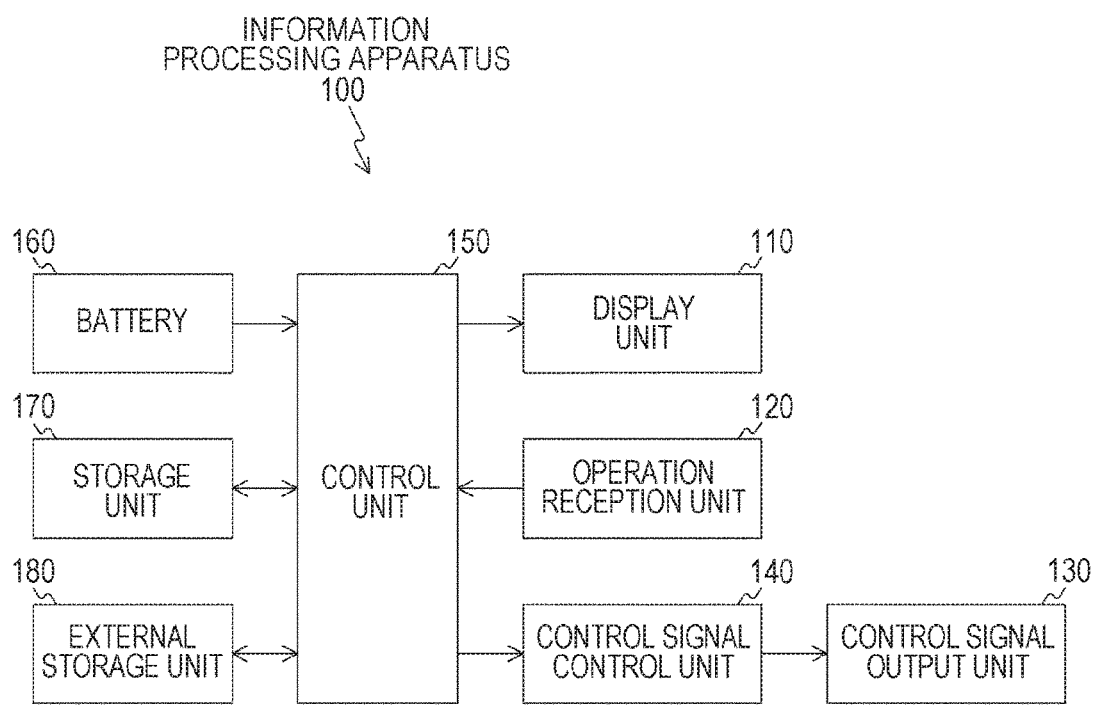
FIG. 1 is a block diagram illustrating an example of a functional configuration of an information processing apparatus 100 according to an embodiment of the present technology.

FIG. 1 is a block diagram illustrating an example of a functional configuration of an information processing apparatus 100 according to an embodiment of the present technology.

Figure 2A:
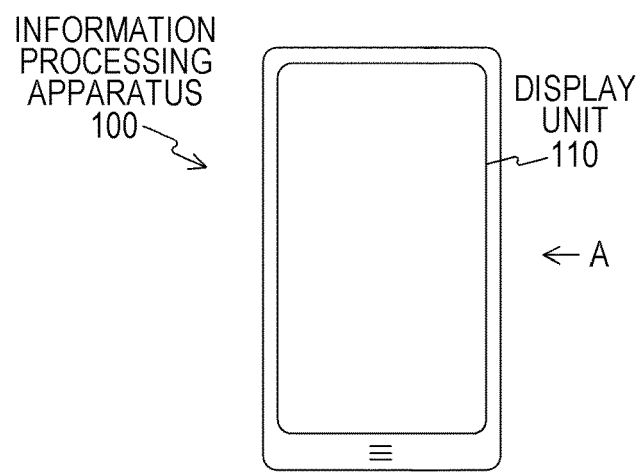
FIGS. 2A, 2B, and 2C are diagrams illustrating an example of an external configuration of the information processing apparatus 100 according to the embodiment of the present technology.
Figure 2B:
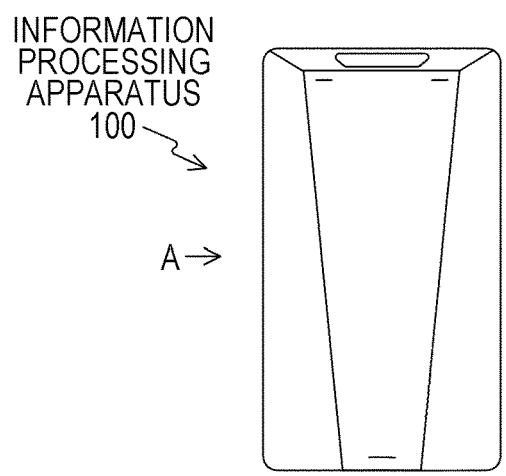
Figure 2C:
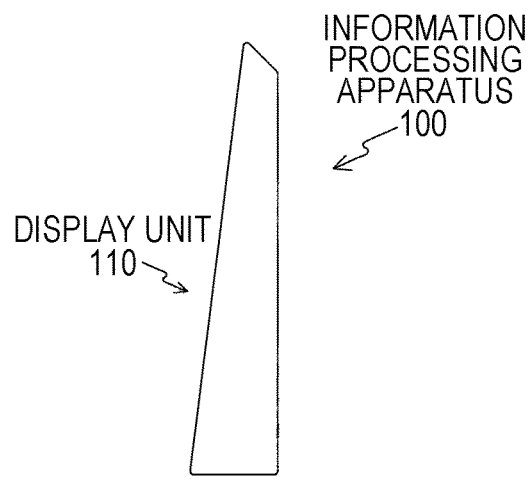

FIGS. 2A, 2B, and 2C are diagrams illustrating an example of an external configuration of the information processing apparatus 100 according to the embodiment of the present technology. A front view is illustrated in FIG. 2A, a rear view is illustrated in FIG. 2B, and a side view (a side view seen from an arrow A) is illustrated in FIG. 2C.

The information processing apparatus 100 includes a display unit 110, an operation reception unit 120, a control signal output unit 130, a control signal control unit 140, a control unit 150, a battery 160, a storage unit 170, and an external storage unit 180. For example, the information processing apparatus 100 is implemented by an infrared remote controller having electronic paper. Alternatively, for example, the information processing apparatus 100 is implemented by an information processing apparatus or an electronic instrument such as a smartphone, a mobile phone, and a tablet terminal. In addition, for example, the information processing apparatus 100 can be configured as an information processing apparatus including a display unit whose display surface has a size equal to or smaller than a predetermined size (for example, a smartphone size) or an information processing apparatus of a size that allows a user to hold the entire apparatus with one hand (for example, a smartphone size). That is, the information processing apparatus 100 can be configured as a portable information processing apparatus in which the display size of the display unit 110 is restricted.

The display unit 110 is a user interface (UI) display unit that displays various types of images on the basis of the control of the control unit 150. For example, electronic paper can be used as the display unit 110. Alternatively, for example, a liquid crystal display (LCD) or an organic electro luminescence (EL) can be used as the display unit 110.

The operation reception unit 120 is an operation reception unit that receives various types of user operations. For example, a touch panel as a pointing device can be used as the operation reception unit 120. Note that the embodiment of the present technology indicates an example in which the display unit 110 and the operation reception unit 120 are integrally formed as a touch panel. However, the display unit 110 and the operation reception unit 120 may be formed integrally as another member or may be configured as different members.

The control signal output unit 130 outputs a control signal. For example, infrared light can be used as the control signal. In addition, in a case where the infrared light is used as the control signal, an infrared light emitting diode (LED) that emits the infrared light can be used as the control signal output unit 130.

The control signal control unit 140 controls the control signal emitted from the control signal output unit 130 on the basis of the control of the control unit 150. For example, in a case where the infrared LED is used as the control signal output unit 130, an infrared controller integrated circuit (IC) for operating the infrared LED can be used as the control signal control unit 140.

The control unit 150 controls each unit in the information processing apparatus 100 on the basis of a control program stored in the storage unit 170. For example, a central processing unit (CPU) can be used as the control unit 150.

The battery 160 is a battery that supplies electric power to each unit in the information processing apparatus 100.

The storage unit 170 is an internal storage unit that stores various types of information. For example, the control program to be executed by the control unit 150 is stored in the storage unit 170. In addition, for example, the storage unit 170 temporarily stores results of various types of arithmetic processes executed by the control unit 150. For example, the storage unit 170 also stores information for displaying each image displayed on the display unit 110 and information for operating each instrument.

The external storage unit 180 is an external storage unit that stores various types of information. For example, the external storage unit 180 stores information regarding a remote controller, information regarding a UI, and the like. In addition, for example, various types of memory cards (for example, an SD card) can be used as the external storage unit 180.

[Example of Remote Controller of Electronic Instrument]

FIG. 3 is a diagram illustrating display examples of a remote controller screen displayed on the display unit 110 of the information processing apparatus 100 according to the embodiment of the present technology. FIG. 3 illustrates display examples of a remote controller screen of a light (lighting fixture), a remote controller screen of an air conditioner, and a remote controller screen of a television.

In FIG. 3, remote controller screens 201 and 202 for the light are illustrated on the left side, remote controller screens 211 and 212 for the air conditioner are illustrated in the middle, and remote controller screens 221 to 223 for the television are illustrated on the right side. The remote controller screen (operation screen) for each instrument is an operation screen on which a plurality of operation buttons (operation elements) for operating each instrument using wireless communication is placed. Note that FIG. 3 illustrates an example in a case where the remote controller screen 221 for the television is displayed on the display unit 110 of the information processing apparatus 100. In addition, the remote controller screen to be displayed on the display unit 110 of the information processing apparatus 100 can be switched by a predetermined user operation.

For example, in a case where the remote controller screens for the same instrument are switched, a predetermined user operation (for example, a vertical swipe operation on the display unit 110) is performed. Meanwhile, in a case where the remote controller screen is switched to a remote controller screen for a different instrument, a predetermined user operation (for example, a horizontal swipe operation on the display unit 110) is performed.

In this manner, since the remote controller screens for a plurality of electronic instruments can be displayed on the display unit 110 of the information processing apparatus 100, the user can easily operate the plurality of electronic instruments using the information processing apparatus 100.

Here, for example, it is assumed that there are frequently used buttons and rarely used buttons by the user. In such a case, it is conceivable that a plurality of electronic instruments can be operated more easily by aggregating frequently used buttons into one or a plurality of screens. An example of such aggregation is illustrated in FIG. 4.

[Aggregation Example of Remote Controller Screens for Plurality of Electronic Instruments]

Figure 4:
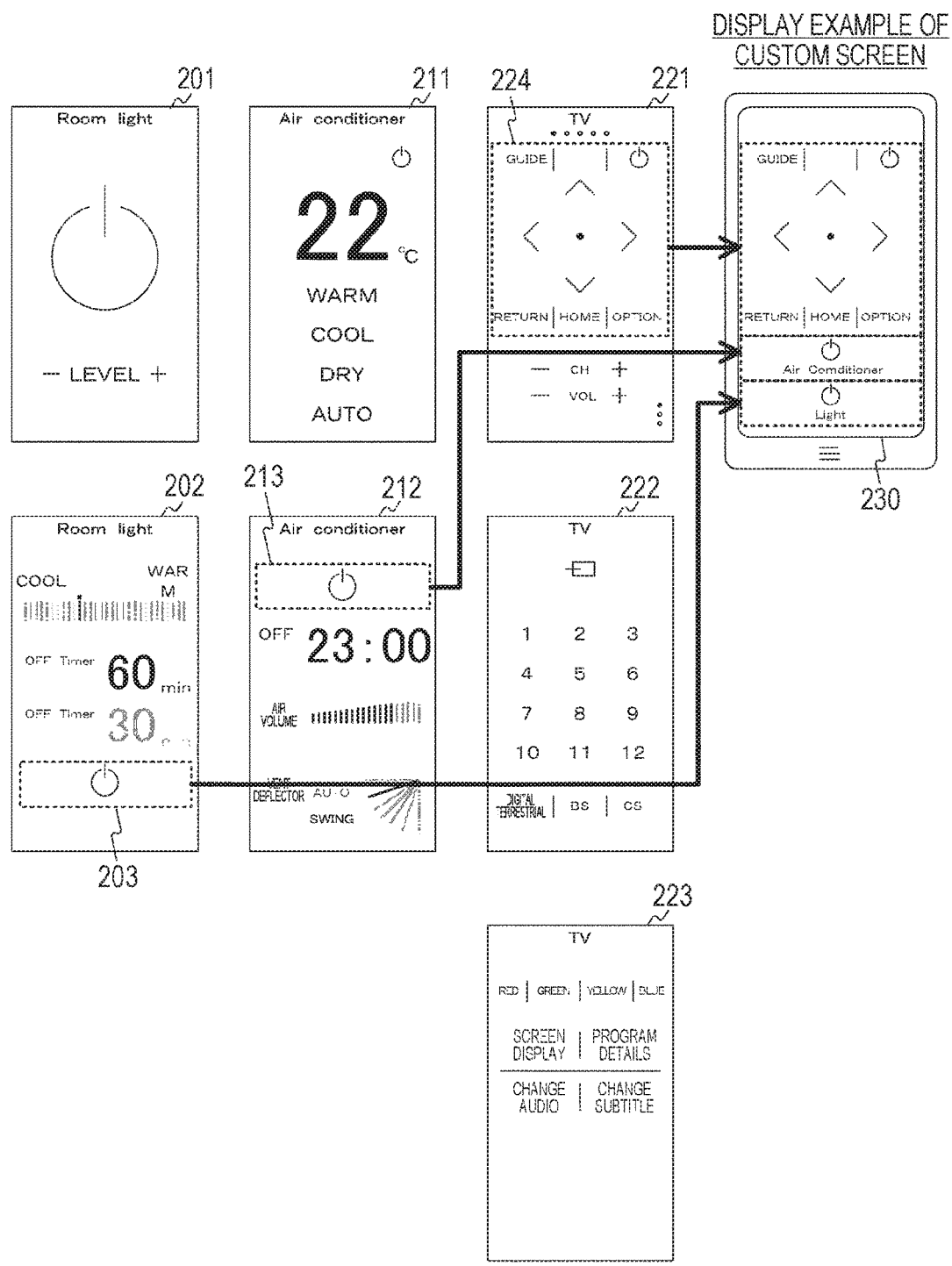
FIG. 4 is a diagram schematically illustrating an example in a case where the remote controller screens displayed on the display unit 110 of the information processing apparatus 100 according to the embodiment of the present technology are aggregated.

FIG. 4 is a diagram schematically illustrating an example in a case where the remote controller screens displayed on the display unit 110 of the information processing apparatus 100 according to the embodiment of the present technology are aggregated.

FIG. 4 illustrates an example in which a part of buttons on the remote controller screen 202 for the light, a part of buttons on the remote controller screen 212 for the air conditioner, and a part of buttons on the remote controller screen 221 for the television are aggregated into one screen (custom screen 230). Specifically, an example is illustrated in which a button within a dotted line rectangle 203, a button within a dotted line rectangle 213, and buttons within a dotted line rectangle 224 are aggregated into one screen (custom screen 230).

In this manner, it is possible to select only the necessary buttons to create the custom screen 230 in which only the wanted buttons are aggregated. In addition, by displaying the custom screen 230 obtained by such aggregation on the display unit 110, the user can operate a plurality of electronic instruments using one screen. With this configuration, it is unnecessary to change UIs even in a case where a plurality of operation objects such as a television and an air conditioner is operated.

Here, for example, a case is assumed in which a screen (selection screen) for selecting and ordering visual elements (operation buttons) and a screen (preview screen) for previewing how the appearance looks after the selection are treated as separate screens on the display unit 110. In this case, the user switches the selection screen to the preview screen to see this preview screen, thereby being able to confirm whether the visual elements after ordering and selecting (the placement of the operation buttons) are different from his/her assumption. In addition, in order to arrange the visual elements (the placement of the operation buttons) as assumed by the user after the confirmation, the user needs to return to the selection screen from the preview screen to perform a selection operation on this selection screen. It is also necessary for the user to shift between the selection screen and the preview screen until the visual elements are arranged as assumed by the user. In this manner, in a case where it takes a long time until the visual elements are arranged as assumed by the user, it is also assumed that stress is given to the user.

Therefore, the embodiment of the present technology will indicate an example of displaying, in a case where wanted buttons are selected from a remote controller of each instrument, a button with the same vertical width as a button selected by the user in a partial region of the selection screen (for example, a left-side preview area). With this configuration, the user can select, for example, how much more buttons can be laid out on one custom remote controller screen while obtaining feedback. Accordingly, the user can easily create a custom remote controller assumed by the user without redundant operations.

[Display Transition Examples in a Case where Custom Remote Controller Screen is Customized]

FIGS. 5 and 6 are diagrams illustrating display transition examples of the display unit 110 in a case where the custom remote controller screen is customized using the information processing apparatus 100 according to the embodiment of the present technology. Note that FIGS. 5 and 6 illustrate a part of the display transition examples in a case where the custom remote controller screen is customized. Meanwhile, FIGS. 11 to 16 illustrate detailed display transition examples in a case where the custom remote controller screen is customized.

As illustrated in the upper part of FIG. 5, in a case where the custom remote controller screen is customized, the user causes the display unit 110 to display a module selection screen 600. A preview image display region 601 and remote controller screens 610 and 620 for respective instruments are displayed on the module selection screen 600.

The preview image display region 601 is a region for displaying a preview image representing a position (a position in an up-down direction) on the custom remote controller screen of an operation button (a module or an operation element) selected by the user operation. In addition, a mark 602 pointing out a position where the next selected operation button (module) is to be placed is displayed in the preview image display region 601.

The remote controller screen for each instrument is a remote controller screen for operating each instrument. FIGS. 5 and 6 illustrate the remote controller screen 610 for an air conditioner and the remote controller screen 620 for a television as examples of the remote controller screen for each instrument. As illustrated in the upper part of FIG. 5, for example, operation buttons 611 to 613 are displayed on the remote controller screen 610 for the air conditioner. In addition, as illustrated in the lower part of FIG. 6, operation buttons 621 to 624 are displayed on the remote controller screen 620 for the television.

For example, as illustrated in the upper part of FIG. 5, a case is assumed in which the custom remote controller screen is customized in a case where the module selection screen 600 is displayed on the display unit 110. In this case, the user performs a selection operation to select an operation button to be used (for example, a pressing operation (touch operation) on a display surface of the display unit 110). Note that the embodiment of the present technology will indicate an example of placing important buttons on an upper side of the custom remote controller screen. That is, the embodiment of the present technology will indicate an example in a case where the user sequentially makes selections starting from important buttons.

The lower part of FIG. 5 illustrates a display example in a case where a selection operation for the operation button 611 is performed on the module selection screen 600. In a case where the selection operation for the operation button 611 is performed in this manner, the operation button 611 for which the selection operation has been performed is put into a selected state. Note that, in FIG. 5, a color is added to the inside of the operation button 611 to represent the selected state. Also for each display example hereinafter, the selected state is similarly represented. In addition, the preview image display region 601 displays a preview image 603 representing a position (a position in the up-down direction) on the custom remote controller screen at which the operation button 611 for which the selection operation has been performed is to be placed. Furthermore, the mark 602 is moved downward and displayed in the preview image display region 601.

The upper part of FIG. 6 illustrates a display example in a case where a selection operation for the operation button 612 is performed on the module selection screen 600. In a case where the selection operation for the operation button 612 is performed in this manner, the operation button 612 for which the selection operation has been performed is put into a selected state. In addition, the preview image display region 601 displays a preview image 604 representing a position (a position in the up-down direction) on the custom remote controller screen at which the operation button 612 for which the selection operation has been performed is to be placed. In this case, the preview image 604 is displayed below the already selected preview image 603 (corresponding to the operation button 611). Furthermore, as illustrated in the upper part of FIG. 6, the size of the operation button 611 in the up-down direction and the size of the preview image 603 in the up-down direction are adjusted to be the same (or substantially the same) as each other. Similarly, the size of the operation button 612 in the up-down direction and the size of the preview image 604 in the up-down direction are adjusted to be the same (or substantially the same) as each other. The same also applies to each display example hereinafter. Furthermore, the mark 602 is moved downward and displayed in the preview image display region 601.

In addition, identification information (for example, a serial number) indicating the order of selection is assigned to the preview images 603 and 604 to be displayed in the preview image display region 601. Furthermore, the same identification information as the identification information of the preview images 603 and 604 is assigned to the operation buttons 611 and 612 corresponding to the preview images 603 and 604 to be displayed. With this configuration, the user can easily grasp the correspondence relationships between the preview images 603 and 604 and the operation buttons 611 and 612. Note that an example of representing the correspondence relationship by assigning the identification information is indicated here, but the correspondence relationship may be represented by another display form. For example, the same color may be added to the corresponding preview image 603 and operation button 611 to be displayed.

The lower part of FIG. 6 illustrates a display example in a case where selection operations for the operation buttons 621 and 624 are sequentially performed on the module selection screen 600 on which the remote controller screen 620 for the television is displayed. Note that switching between the remote controller screens for respective instruments will be described in detail with reference to FIGS. 12 and 13.

In a case where the selection operation for the operation button 621 is performed in this manner, the operation button 621 for which the selection operation has been performed is put into a selected state. In addition, the preview image display region 601 displays a preview image 605 representing a position (a position in the up-down direction) on the custom remote controller screen at which the operation button 621 for which the selection operation has been performed is to be placed. Next, in a case where the selection operation for the operation button 624 is performed, the operation button 624 for which the selection operation has been performed is put into a selected state. In addition, the preview image display region 601 displays a preview image 606 representing a position (a position in the up-down direction) on the custom remote controller screen at which the operation button 624 for which the selection operation has been performed is to be placed. Furthermore, the mark 602 is successively moved downward and displayed in the preview image display region 601.

Figure 7:
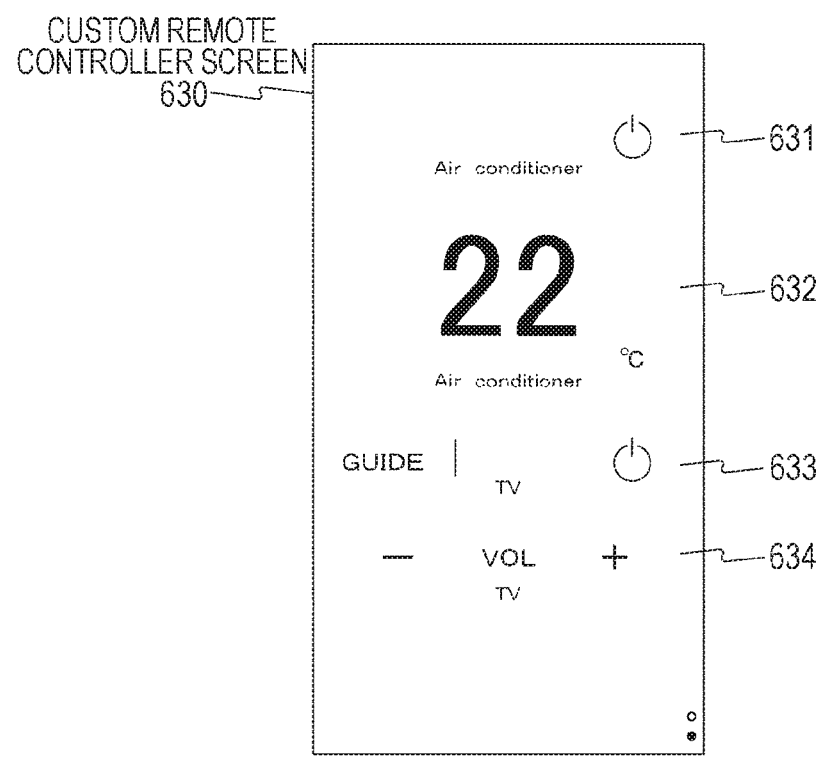
FIG. 7 is a diagram illustrating a display example of the custom remote controller screen displayed on the display unit 110 of the information processing apparatus 100 according to the embodiment of the present technology.

A display example of the custom remote controller screen created in this manner is illustrated in FIG. 7.

[Display Example of Custom Remote Controller Screen]

FIG. 7 is a diagram illustrating a display example of the custom remote controller screen displayed on the display unit 110 of the information processing apparatus 100 according to the embodiment of the present technology.

Operation buttons (modules) for operating one or a plurality of instruments are displayed on the custom remote controller screen 630. FIG. 7 illustrates the custom remote controller screen 630 on which respective operation buttons 631 to 634 selected by the selection operations illustrated in FIGS. 5 and 6 are placed.

As illustrated in FIG. 7, the positions of the operation buttons 631 to 634 on the custom remote controller screen 630 correspond to the positions of the preview images 603 to 606 in the preview image display region 601 illustrated in the lower part of FIG. 6. Accordingly, the user can customize the custom remote controller screen while confirming the positions of the preview images in the preview image display region 601 illustrated in FIGS. 5 and 6. In this manner, the user can generate the custom remote controller screen including only the operation elements desired by the user, among the operation elements on one or a plurality of remote controller screens.

Here, a plurality of custom remote controller screens can be created and registered as the custom remote controller screens. For example, it is possible to create and register a custom remote controller screen only for turning on and off the power of each instrument, or a custom remote controller screen for operating an audio system constituted by a plurality of instruments.

In addition, the embodiment of the present technology indicates an example of setting the placement in a vertical direction on the custom remote controller screen. However, the present technology can also be applied to the case of setting the placement in a horizontal direction on the custom remote controller screen.

[Display Transition Example in a Case where Remote Controller of New Instrument is Additionally Registered]

Figure 8:
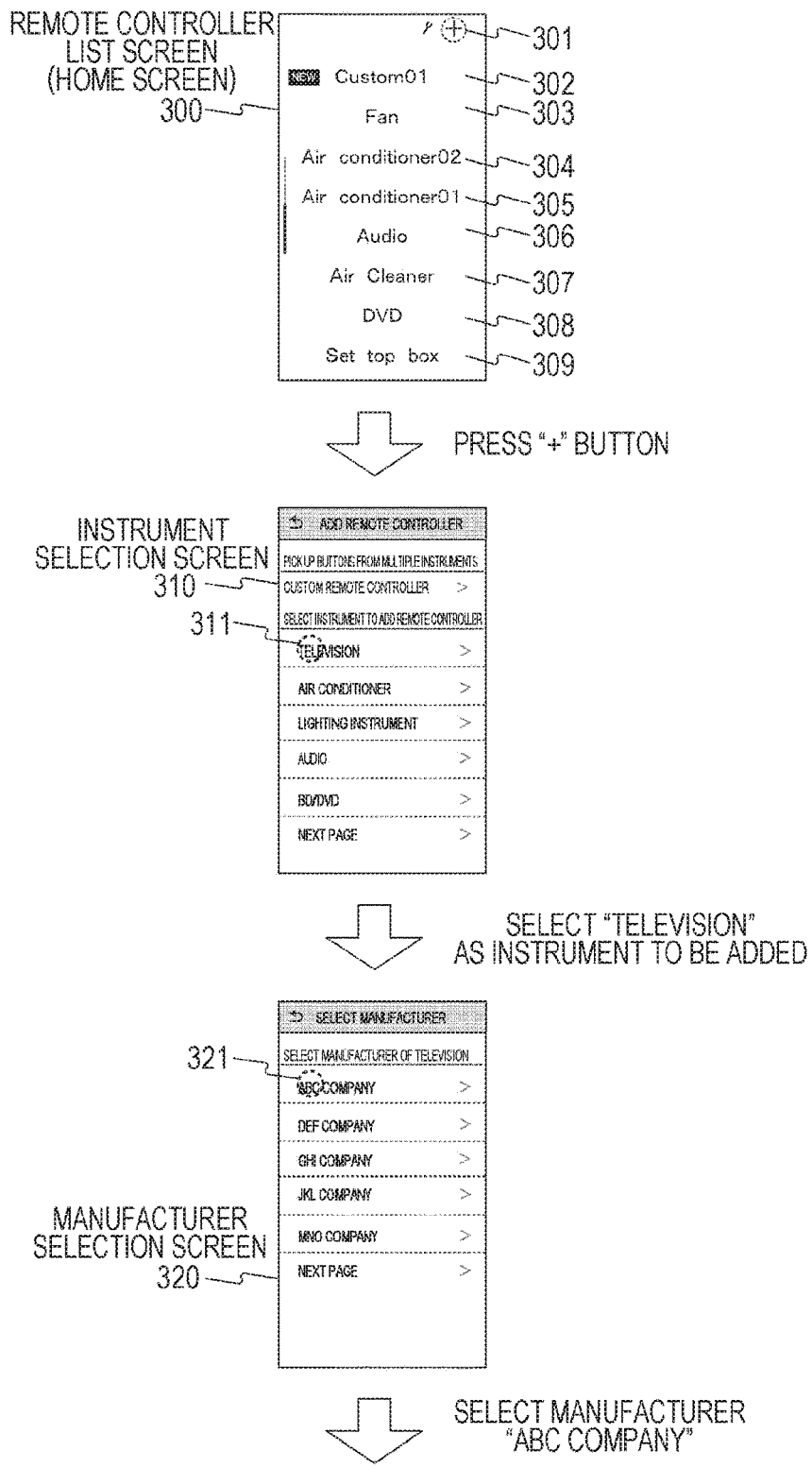
FIG. 8 is a diagram illustrating a display transition example of the display unit 110 in a case where a remote controller of a new instrument is additionally registered using the information processing apparatus 100 according to the embodiment of the present technology.
Figure 9:
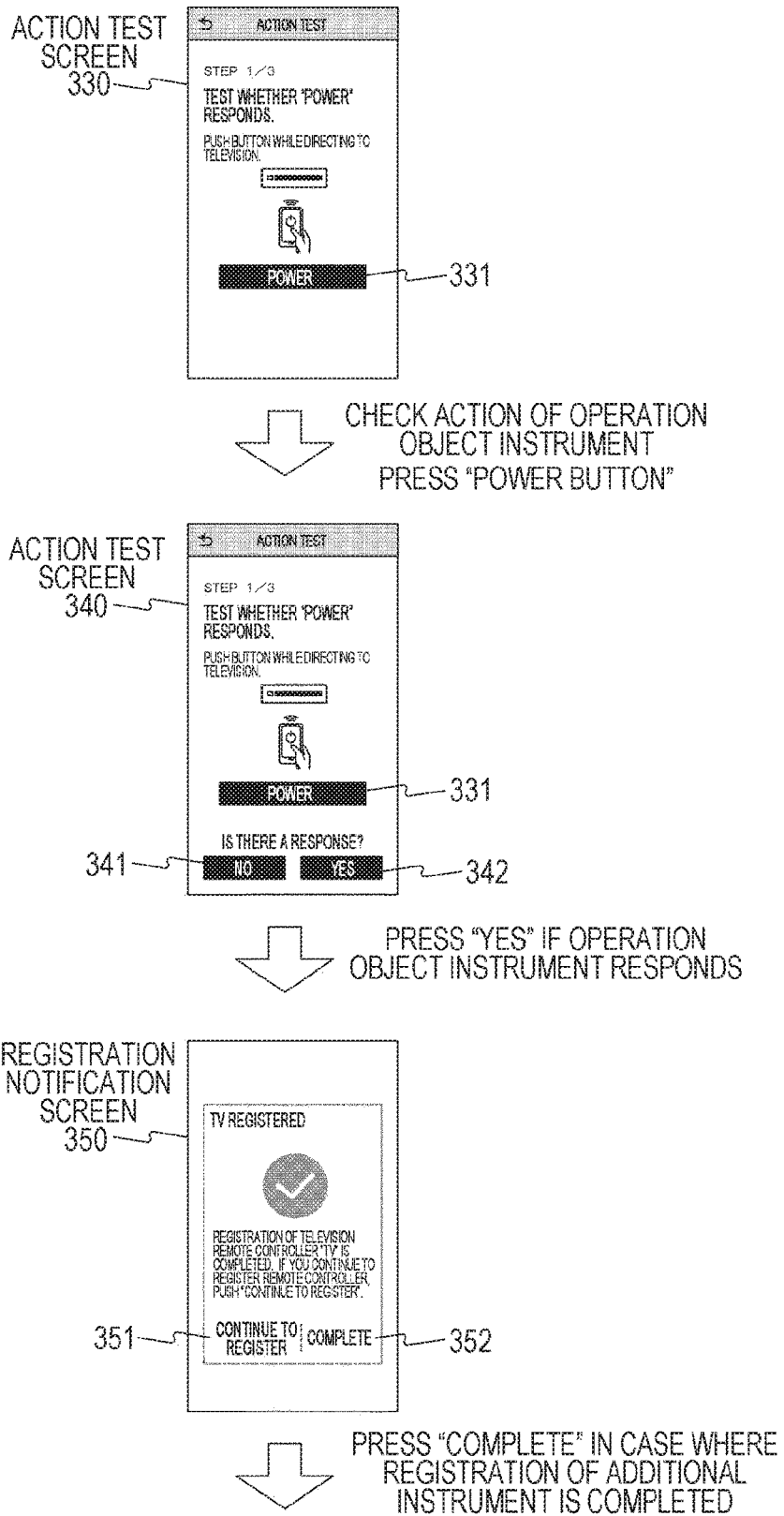
FIG. 9 is a diagram illustrating a display transition example of the display unit 110 in a case where a remote controller of a new instrument is additionally registered using the information processing apparatus 100 according to the embodiment of the present technology.
Figure 10:
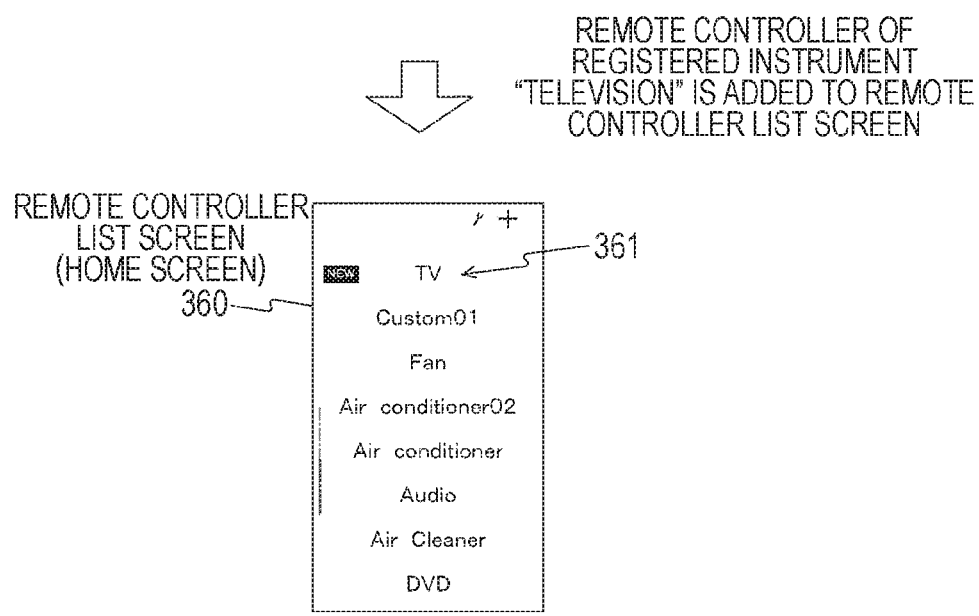
FIG. 10 is a diagram illustrating a display transition example of the display unit 110 in a case where a remote controller of a new instrument is additionally registered using the information processing apparatus 100 according to the embodiment of the present technology.

FIGS. 8 to 10 are diagrams illustrating display transition examples of the display unit 110 in a case where a remote controller of a new instrument is additionally registered using the information processing apparatus 100 according to the embodiment of the present technology. Note that, in FIGS. 8 to 10, a portion (a portion in the display unit 110) where a selection operation by the user (for example, a pressing operation (touch operation) on the display surface of the display unit 110) is performed is indicated by a dotted line circle. Also each display example hereinafter is similarly represented.

First, the user performs a predetermined operation (for example, a pressing operation on the touch panel of the display unit 110), thereby causing the display unit 110 to display a remote controller list screen (home screen) 300 as illustrated in the upper part of FIG. 8.

On the remote controller list screen (home screen) 300, a "+" button 301, an operation button 302 for displaying the custom remote controller screen, and operation buttons 302 to 309 for displaying the remote controller screens for respective instruments are displayed.

Then, in a case where a remote controller of a new instrument is registered, the user performs a pressing operation to press the "+" button 301 on the remote controller list screen (home screen) 300.

In a case where the pressing operation for the "+" button 301 is performed, the control unit 150 of the information processing apparatus 100 displays an instrument selection screen 310 on the display unit 110 as illustrated in the middle part of FIG. 8. The instrument selection screen 310 is a display screen for selecting an instrument to be additionally registered. On the instrument selection screen 310, for example, instruments such as a television, an air conditioner, a lighting instrument, an audio, a Blu-ray disc (BD)/DVD player are displayed as object instruments to be selected. Note that this example will indicate a case where "television" is selected as an instrument to be added.

In a case where a selection operation for selecting a television (for example, a pressing operation on a television display region 311) is performed, the control unit 150 of the information processing apparatus 100 displays a manufacturer selection screen 320 on the display unit 110 as illustrated in the lower part of FIG. 8. The manufacturer selection screen 320 is a display screen for selecting a manufacturer of "television" as the instrument to be additionally registered. For example, each manufacturer that manufactures a television is displayed on the manufacturer selection screen 320. Note that this example will indicate a case where "ABC Company" is selected as a manufacturer of "television" as the instrument to be added.

In a case where a selection operation for selecting the manufacturer (for example, a pressing operation on an ABC Company display region 321) is performed, the control unit 150 of the information processing apparatus 100 displays an action test screen 330 on the display unit 110 as illustrated in the upper part of FIG. 9. The action test screen 330 is a display screen used in confirming the action of "television" (manufacturer: ABC Company) as the instrument to be additionally registered. On the action test screen 330, for example, a message to the effect that a test for confirming the action of "television" as the instrument to be additionally registered is to be performed, an operation method therefor, and an operation member (for example, a power button 331) for performing this test are displayed on the display unit 110. The upper part of FIG. 9 illustrates an example of displaying the power button 331 for turning on the power of the television as an operation member for performing the test.

While seeing the operation method for the test displayed on the action test screen 330, the user operates the operation member for performing this test. For example, while the control signal output unit 130 of the information processing apparatus 100 is directed to the television, a pressing operation to press the power button 331 is performed.

In a case where the pressing operation for the power button 331 is performed, the control unit 150 of the information processing apparatus 100 controls the control signal control unit 140 to output a control signal (test signal) for turning on the power of the television (manufacturer: ABC Company) from the control signal output unit 130. In addition, the control unit 150 of the information processing apparatus 100 displays an action test screen 340 as illustrated in the middle part of FIG. 9. The action test screen 340 is obtained by adding a "NO" button 341 and a "YES" button 342 to the action test screen 330.

After the pressing operation for the power button 331, the user visually confirms whether the power of the television (manufacturer: ABC Company) has been turned on. Then, in a case where the power of the television (manufacturer: ABC Company) has not been turned on, the user performs a pressing operation to press the "NO" button 341 on the action test screen 340. In a case where the pressing operation for the "NO" button 341 is performed, the control unit 150 of the information processing apparatus 100 controls the control signal control unit 140 to output another control signal (test signal) for turning on the power of the television (manufacturer: ABC Company) from the control signal output unit 130.

Meanwhile, in a case where the power of the television (manufacturer: ABC Company) has been turned on, the user performs a pressing operation to press the "YES" button 342 on the action test screen 340. In a case where the pressing operation for the "YES" button 342 is performed, the control unit 150 of the information processing apparatus 100 displays a registration notification screen 350 on the display unit 110 as illustrated in the lower part of FIG. 9. On the registration notification screen 350, a message to the effect that the registration of "television" has been completed, a Continue to register button 351, and a "Complete" button 352 are displayed. In this case, in a case where another instrument is to be additionally registered continuously, the user performs a pressing operation to press the Continue to register button 351. In a case where the pressing operation for the Continue to register button 351 is performed, the control unit 150 of the information processing apparatus 100 displays the instrument selection screen 310 illustrated in the middle part of FIG. 8 on the display unit 110.

In a case where the registration of the additional instrument is completed, the user performs a pressing operation to press the "Complete" button 352. In a case where the pressing operation for the "Complete" button 352 is performed, the control unit 150 of the information processing apparatus 100 displays a remote controller list screen (home screen) 360 on the display unit 110 as illustrated in FIG. 10. The remote controller list screen (home screen) 360 is a display screen obtained by adding a remote controller (TV 361) of the additionally registered instrument "television" to the remote controller list screen (home screen) 300 illustrated in FIG. 8.

[Display Transition Examples in a Case where Custom Remote Controller Screen is Customized]

FIGS. 11 to 16 are diagrams illustrating display transition examples of the display unit 110 in a case where the custom remote controller screen is customized using the information processing apparatus 100 according to the embodiment of the present technology.

Figure 11:
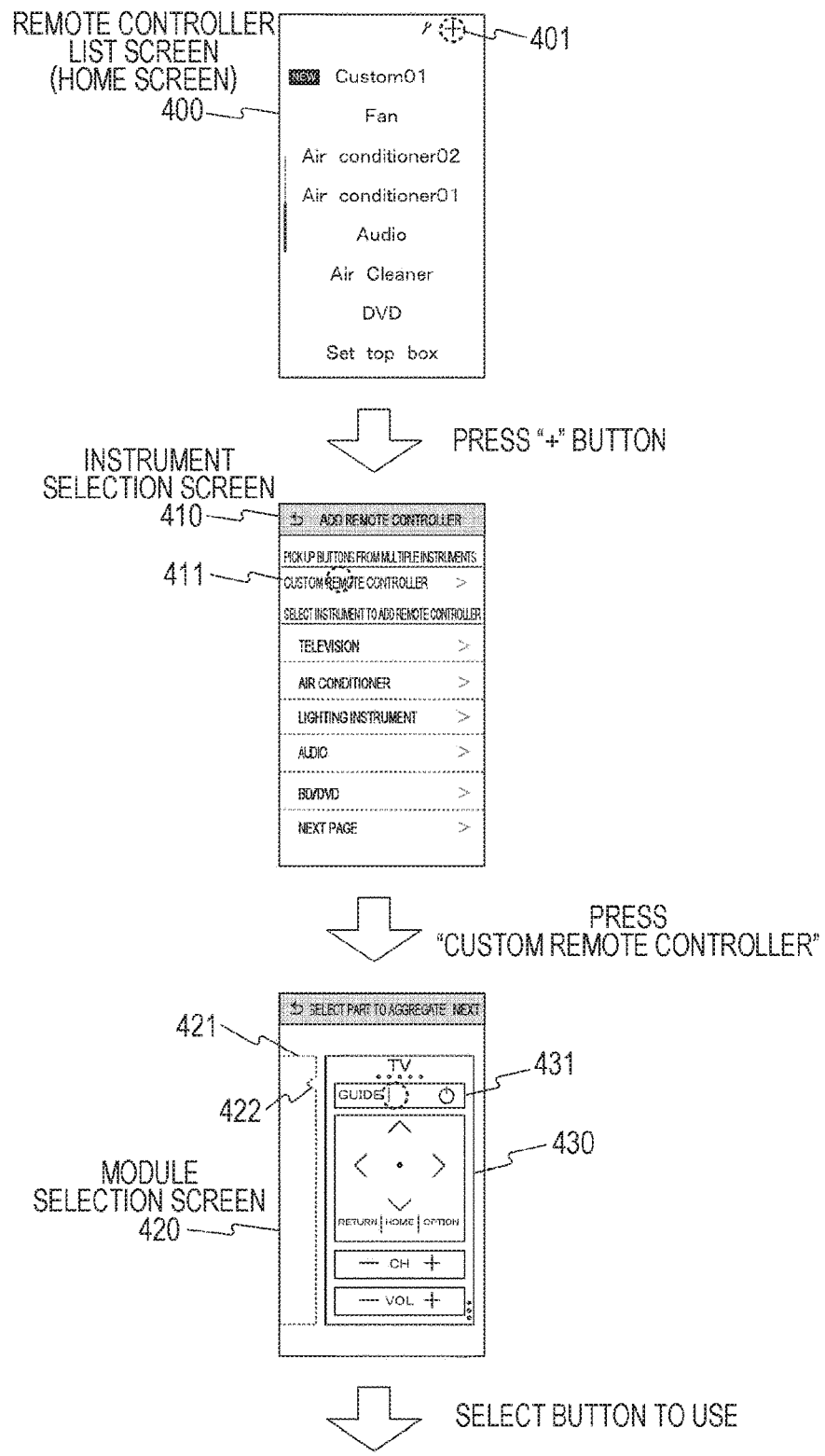
FIG. 11 is a diagram illustrating a display transition example of the display unit 110 in a case where the custom remote controller screen is customized using the information processing apparatus 100 according to the embodiment of the present technology.

First, the user performs a predetermined operation (for example, a pressing operation on the touch panel of the display unit 110), thereby causing the display unit 110 to display a remote controller list screen (home screen) 400 as illustrated in the upper part of FIG. 11. Note that the remote controller list screen (home screen) 400 corresponds to the remote controller list screens (home screens) 300 and 360 illustrated in the upper part of FIG. 8 and FIG. 10.

In a case where the custom remote controller screen is customized, the user performs a pressing operation to press a "+" button 401 on the remote controller list screen (home screen) 400.

In a case where the pressing operation for the "+" button 401 is performed, the control unit 150 of the information processing apparatus 100 displays an instrument selection screen 410 on the display unit 110 as illustrated in the upper part of FIG. 11. The instrument selection screen 410 corresponds to the instrument selection screen 310 illustrated in the middle part of FIG. 8. In a case where the custom remote controller screen is customized, the user performs a pressing operation to press a "Custom remote controller" button 411.

In a case where the pressing operation for the "Custom remote controller" button 411 is performed, the control unit 150 of the information processing apparatus 100 displays a module selection screen 420 on the display unit 110 as illustrated in the lower part of FIG. 11. The module selection screen 420 is a display screen for customizing the custom remote controller screen on which operation buttons according to the user's preference are placed and corresponds to the module selection screen 600 illustrated in FIGS. 5 and 6. The lower part of FIG. 11 illustrates an example in which the display unit 110 is caused to display a first page 430 of a television remote controller screen on the module selection screen 420. In addition, a preview image display region 421 and a mark 422 are displayed on the module selection screen 420.

On the module selection screen 420, the user performs a selection operation to select a button to be used. The lower part of FIG. 11 illustrates an example in which the user performs a selection operation to select a "GUIDE" button 431 (a pressing operation for the "GUIDE" button 431) on the first page 430 of the television remote controller screen. In this case, as illustrated in the upper part of FIG. 12, the control unit 150 of the information processing apparatus 100 puts the region of the "GUIDE" button 431 for which the selection operation has been performed into a selected state. In addition, the control unit 150 of the information processing apparatus 100 displays, in the preview image display region 421, a preview image 423 representing a position (a position in the up-down direction) on the custom remote controller screen at which the "GUIDE" button 431 for which the selection operation has been performed is to be placed. With this configuration, the user can easily grasp what position the selected "GUIDE" button 431 is to be displayed on the custom remote controller screen. Furthermore, the control unit 150 of the information processing apparatus 100 moves the mark 422 downward in the preview image display region 421 to display.

Similarly, on the module selection screen 420, the user performs a selection operation to select a button to be used.

Figure 12:
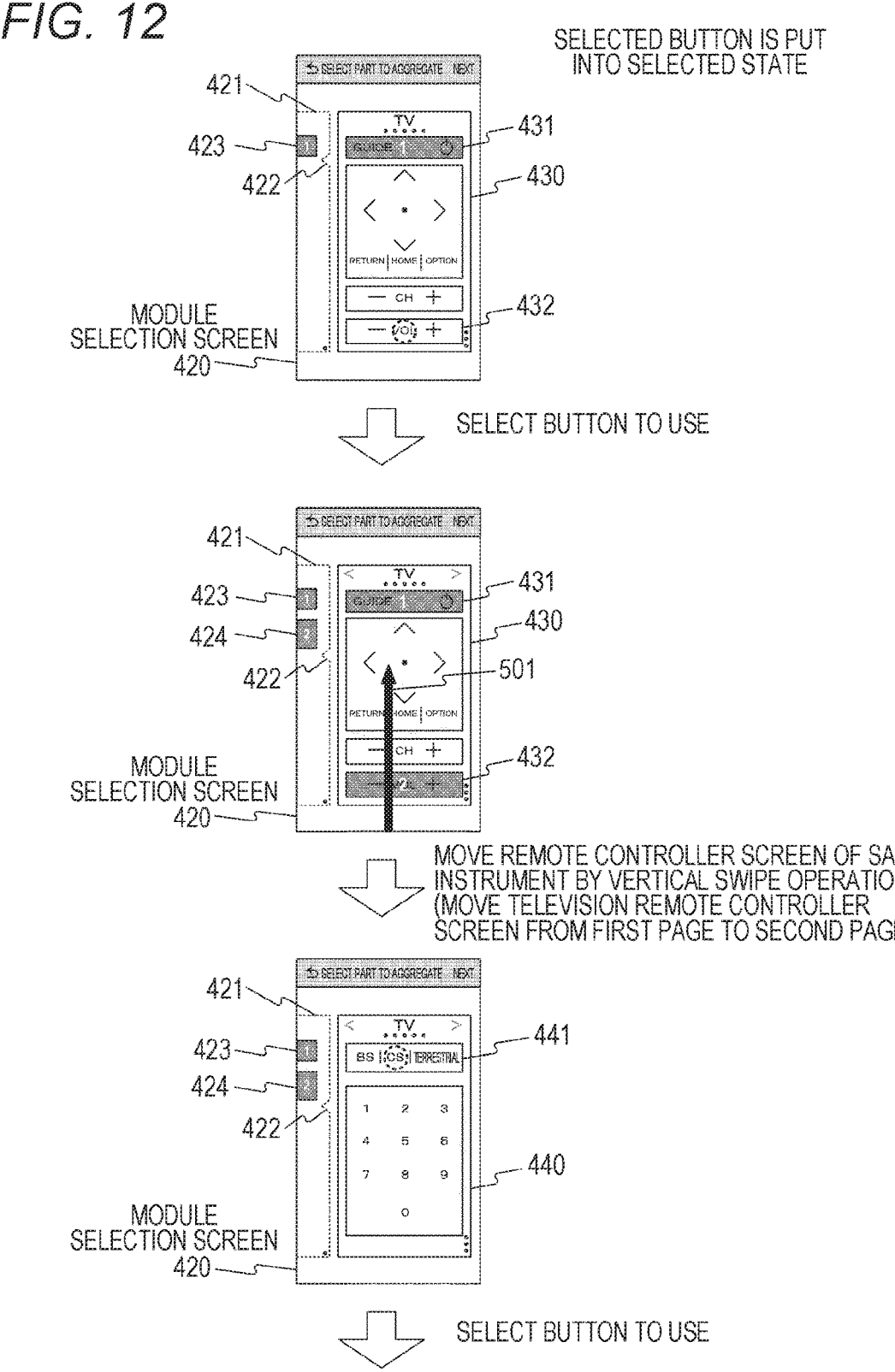
FIG. 12 is a diagram illustrating a display transition example of the display unit 110 in a case where the custom remote controller screen is customized using the information processing apparatus 100 according to the embodiment of the present technology.
Figure 14:
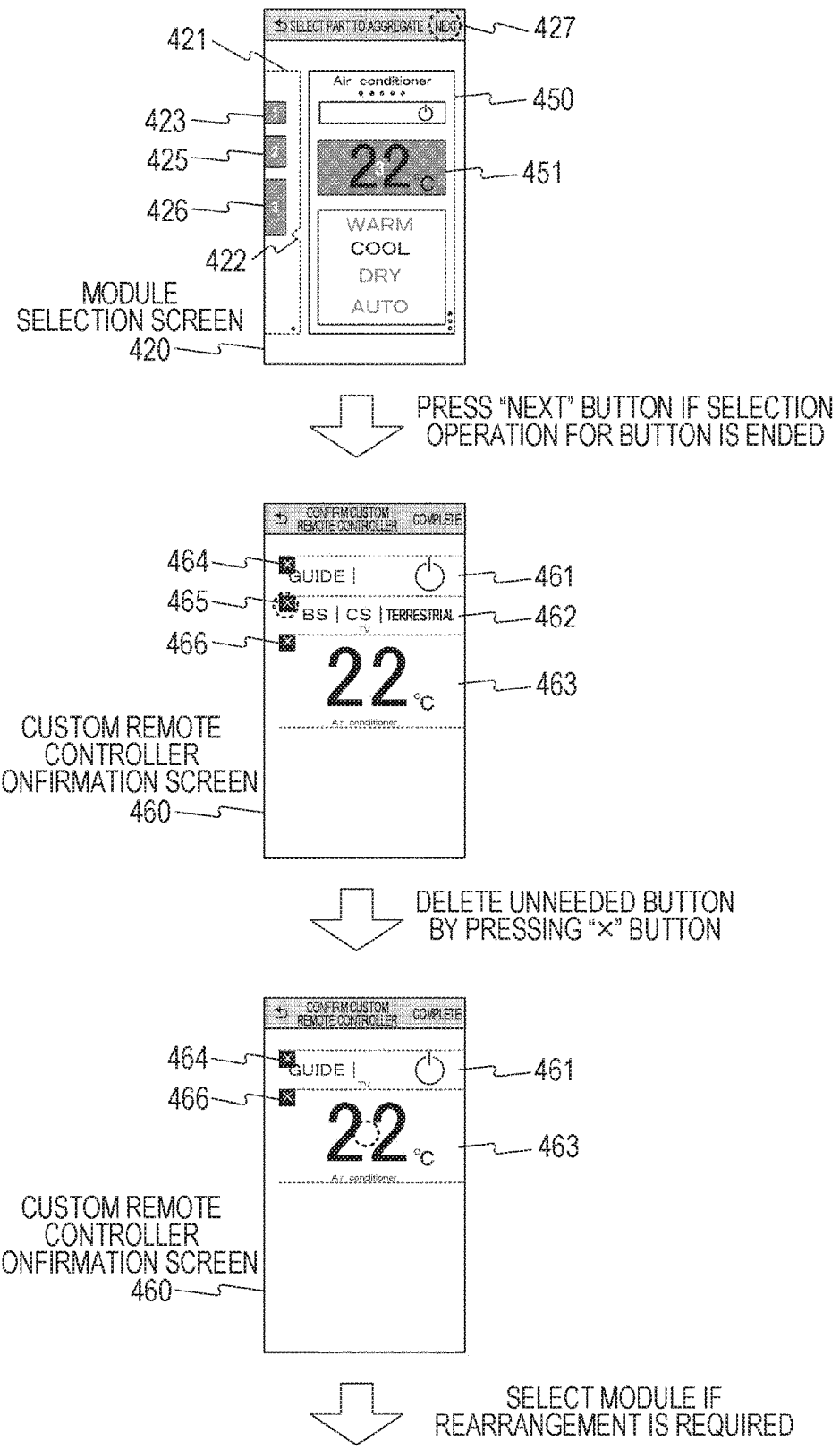
FIG. 14 is a diagram illustrating a display transition example of the display unit 110 in a case where the custom remote controller screen is customized using the information processing apparatus 100 according to the embodiment of the present technology.

The upper part of FIG. 12 illustrates an example in which the user performs a selection operation to select a "−VOL+" button 432 (a pressing operation for the "−VOL+" button 432) on the first page 430 of the television remote controller screen. In this case, as illustrated in the middle part of FIG. 12, the control unit 150 of the information processing apparatus 100 puts the region of the "−VOL+" button 432 into a selected state and also displays a preview image 424 corresponding to the "−VOL+" button 432 in the preview image display region 421. Furthermore, the control unit 150 of the information processing apparatus 100 moves the mark 422 downward in the preview image display region 421 to display.

Here, in a case where another page of the television remote controller screen is caused to be displayed on the module selection screen 420, the user performs a movement operation (switching operation) to move the first page 430 of the television remote controller screen on the module selection screen 420. For example, a vertical swipe operation (indicated by an arrow 501 illustrated in the middle part of FIG. 12) is performed as that movement operation. With this operation, as illustrated in the lower part of FIG. 12, a second page 440 of the television remote controller screen is displayed on the module selection screen 420.

In a case where the second page 440 of the television remote controller screen is displayed in this manner, the user performs a selection operation to select a button to be used. The lower part of FIG. 12 illustrates an example in which the user performs a selection operation to select a "BS CS Terrestrial" button 441 (a pressing operation for the "BS CS Terrestrial" button 441) on the second page 440 of the television remote controller screen. In this case, as illustrated in the upper part of FIG. 13, the control unit 150 of the information processing apparatus 100 puts the region of the "BS CS Terrestrial" button 441 for which the selection operation has been performed into a selected state. In addition, the control unit 150 of the information processing apparatus 100 displays, in the preview image display region 421, a preview image 425 corresponding to the "BS CS Terrestrial" button 441 for which the selection operation has been performed. Furthermore, the control unit 150 of the information processing apparatus 100 moves the mark 422 downward in the preview image display region 421 to display.

Here, an example will be indicated in which the user deletes an unnecessary button from among buttons selected as those to be used. The example here indicates a case where the selected state of the "−VOL+" button 432 illustrated in the middle part of FIG. 12 is deleted. That is, an example in a case where the selection of the button corresponding to the preview image 424 ("−VOL+" button 432) is deleted is indicated.

Specifically, from among the preview images 423 to 425 displayed in the preview image display region 421, the user performs a pressing operation (selection release operation) for the preview image 424 corresponding to the button for which the selection is to be released. Note that the selection may be released by performing a pressing operation to press a button in a selected state.

In a case where the selection release operation is performed in this manner, the preview image 424 for which the selection release operation has been performed is deleted from among the preview images 423 to 425 displayed in the preview image display region 421.

Here, in a case where the television remote controller screen is to be changed to another remote controller screen on the module selection screen 420, the user performs a switching operation to switch to another remote controller screen on the module selection screen 420. As an example of this switching operation, an example will be indicated in which a first page 450 of an air conditioner remote controller screen is displayed by a horizontal swipe operation (indicated by an arrow 502 illustrated in the middle part of FIG. 13). With this operation, as illustrated in the lower part of FIG. 13, the first page 450 of the air conditioner remote controller screen is displayed on the module selection screen 420.

In a case where the first page 450 of the air conditioner remote controller screen is displayed in this manner, the user performs a selection operation to select a button to be used. The lower part of FIG. 13 illustrates an example in which the user performs a selection operation to select a "22° C." button 451 (a pressing operation for the "22° C." button 451) on the first page 450 of the air conditioner remote controller screen. In this case, as illustrated in the upper part of FIG. 14, the control unit 150 of the information processing apparatus 100 puts the region of the "22° C." button 451 for which the selection operation has been performed into a selected state. In addition, the control unit 150 of the information processing apparatus 100 displays, in the preview image display region 421, a preview image 426 corresponding to the "22° C." button 451 for which the selection operation has been performed. Furthermore, the control unit 150 of the information processing apparatus 100 moves the mark 422 downward in the preview image display region 421 to display.

Additionally, in a case where the selection operation for the button to be used is ended, the user performs a pressing operation to press a "Next" button 427. In a case where the pressing operation for the "Next" button 427 is performed, the control unit 150 of the information processing apparatus 100 displays a custom remote controller confirmation screen 460 on the display unit 110 as illustrated in the middle part of FIG. 14. The respective buttons 461 to 463 selected by the selection operations by the user are displayed on the custom remote controller confirmation screen 460. The respective buttons 461 to 463 are buttons corresponding to the preview images 423, 425, and 426 illustrated in the upper part of FIG. 14. In addition, "x" buttons 464 to 466 are displayed in the upper left corners of the display regions of the buttons 461 to 463, respectively.

Here, in a case where there is an unneeded button among the buttons 461 to 463 displayed on the custom remote controller confirmation screen 460, the user can delete the unneeded button by performing a pressing operation for a corresponding one of the "x" buttons 464 to 466. The example here will indicate a case where the "BS CS Terrestrial" button 462 is to be deleted. That is, the user can delete the "BS CS Terrestrial" button 462 as illustrated in the lower part of FIG. 14 by performing a pressing operation to press the "x" button 465.

Here, an example in a case where the buttons are to be rearranged will be indicated. For example, a button required to be rearranged is selected and, after this selection, a designation operation to designate a new position of the selected button is performed. Specifically, as illustrated in the lower part of FIG. 14, a selection operation to select the "22° C." button 463 is performed. Subsequently, as illustrated in the upper part of FIG. 15, a designation operation to designate a new position 467 of the "22° C." button 463 is performed. In a case where the designation operation is performed in this manner, the control unit 150 of the information processing apparatus 100 replaces the positions of the "22° C." button 463 and the "GUIDE" button 461 to display as illustrated in the middle part of FIG. 15.

Figure 15:
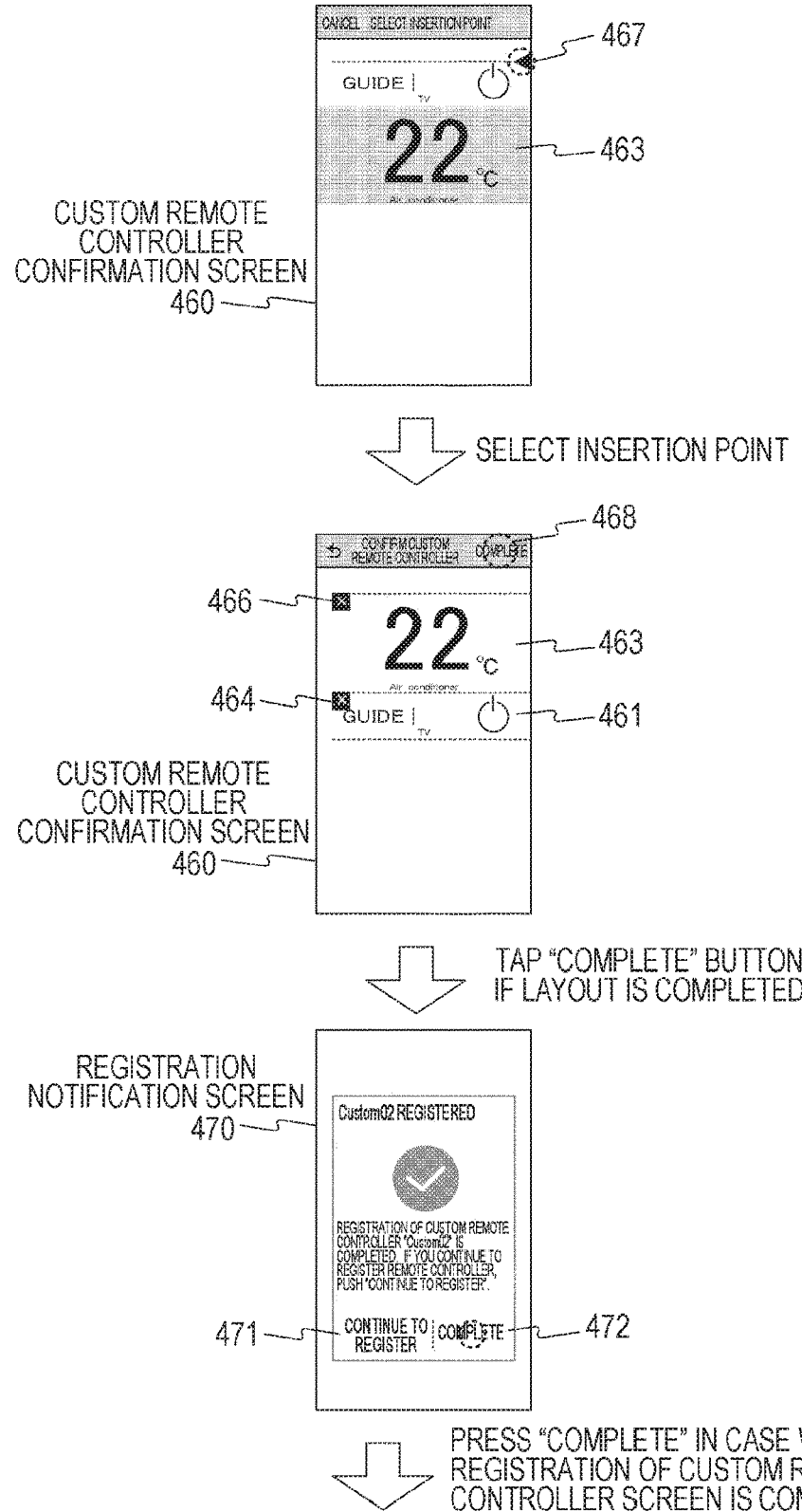
FIG. 15 is a diagram illustrating a display transition example of the display unit 110 in a case where the custom remote controller screen is customized using the information processing apparatus 100 according to the embodiment of the present technology.

In a case where the layout of the custom remote controller screen is completed, the user performs a pressing operation to press the "Complete" button 468 on the custom remote controller confirmation screen 460 as illustrated in the middle part of FIG. 15. In a case where the pressing operation for the "Complete" button 468 is performed, the control unit 150 of the information processing apparatus 100 displays a registration notification screen 470 on the display unit 110 as illustrated in the lower part of FIG. 15. On the registration notification screen 470, a message to the effect that the registration of a custom remote controller "Custom02" has been completed, a Continue to register button 471, and a "Complete" button 472 are displayed. In this case, in a case where another custom remote controller is to be additionally registered continuously, the user performs a pressing operation to press the Continue to register button 471. In a case where the pressing operation for the Continue to register button 471 is performed, the control unit 150 of the information processing apparatus 100 displays the instrument selection screen 410 illustrated in the middle part of FIG. 11 on the display unit 110.

Figure 16:
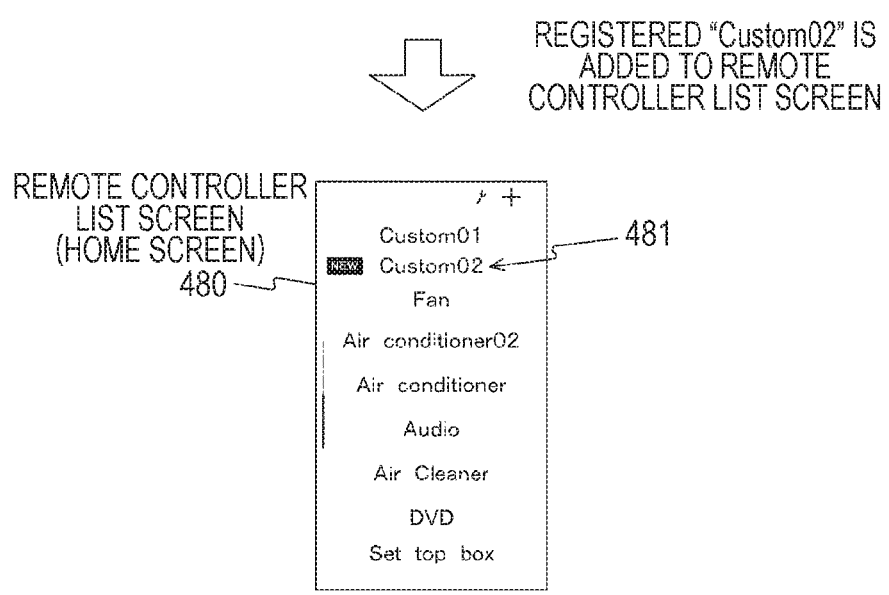
FIG. 16 is a diagram illustrating a display transition example of the display unit 110 in a case where the custom remote controller screen is customized using the information processing apparatus 100 according to the embodiment of the present technology.

In a case where the registration of the custom remote controller is completed, the user performs a pressing operation to press the "Complete" button 472. In a case where the pressing operation for the "Complete" button 472 is performed, the control unit 150 of the information processing apparatus 100 displays a remote controller list screen (home screen) 480 on the display unit 110 as illustrated in FIG. 16. The remote controller list screen (home screen) 480 is a display screen obtained by adding the additionally registered custom remote controller "Custom 02" 481 to the remote controller list screen (home screen) 400 illustrated in the upper part of FIG. 11.

[Action Example of Information Processing Apparatus]

Figure 17:
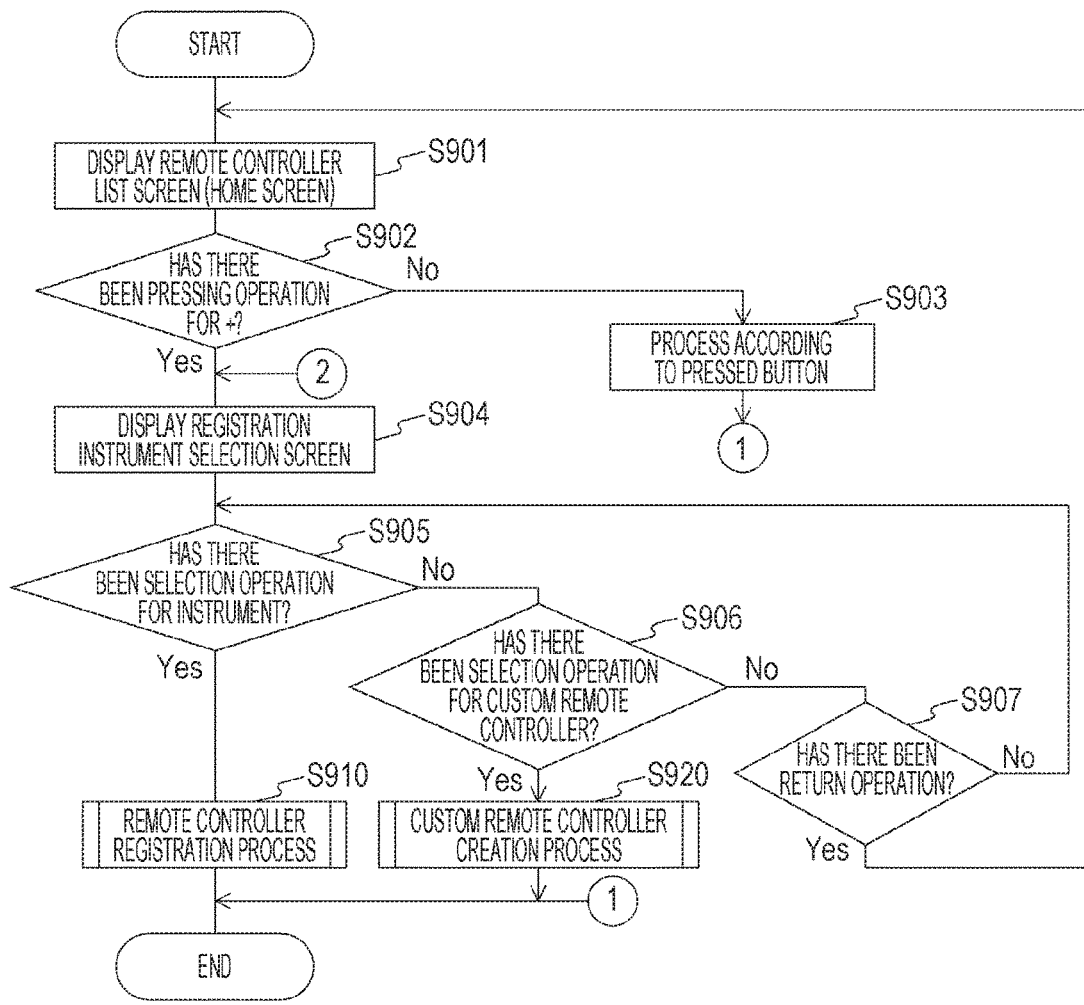
FIG. 17 is a flowchart illustrating an example of the process procedure of a registration process by the information processing apparatus 100 according to the embodiment of the present technology.

FIG. 17 is a flowchart illustrating an example of the process procedure of a registration process by the information processing apparatus 100 according to the embodiment of the present technology.

First, the control unit 150 of the information processing apparatus 100 displays the remote controller list screen (home screen) on the display unit 110 (step S901). Subsequently, the control unit 150 determines whether a pressing operation for the "+" button (for example, the "+" button 301 illustrated in the upper part of FIG. 8) has been performed (step S902). In a case where the pressing operation for the "+" button has not been performed (in a case where another operation has been performed) (step S902), the control unit 150 performs a process according to the another operation (step S903) and ends the action of the registration process.

In a case where the pressing operation for the "+" button has been performed (step S902), the control unit 150 displays the instrument selection screen (for example, the instrument selection screen 310 illustrated in the middle part of FIG. 8) on the display unit 110 (step S904).

Subsequently, the control unit 150 determines whether a selection operation to select an instrument has been performed on the instrument selection screen (step S905). In a case where the selection operation to select an instrument has been performed (step S905), a remote controller registration process is performed (step S910). This remote controller registration process will be described in detail with reference to FIG. 18.

In a case where the selection operation to select an instrument has not been performed (step S905), the control unit 150 determines whether a selection operation to select a custom remote controller has been performed on the instrument selection screen (step S906). In a case where the selection operation to select a custom remote controller has been performed (step S906), a custom remote controller creation process is performed (step S920). This custom remote controller creation process will be described in detail with reference to FIG. 19.

In a case where the selection operation to select a custom remote controller has not been performed (step S906), the control unit 150 determines whether a return operation has been performed (step S907). Then, in a case where the return operation has been performed (step S907), the process returns to step S901. Meanwhile, in a case where the return operation has not been performed (step S907), the process returns to step S905.

[Action Example of Remote Controller Registration Process]

Figure 18:
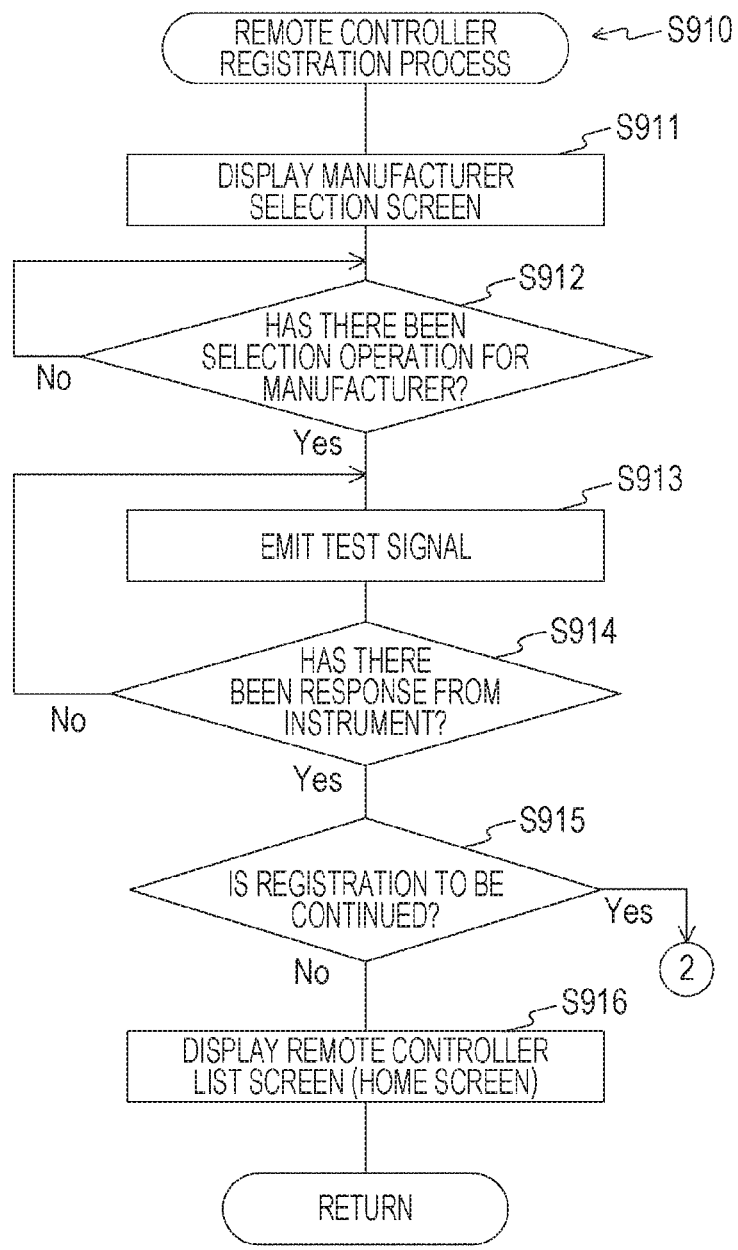
FIG. 18 is a flowchart illustrating an example of the process procedure of a remote controller registration process included in the registration process by the information processing apparatus 100 according to the embodiment of the present technology.

FIG. 18 is a flowchart illustrating an example of the process procedure of the remote controller registration process (step S910 illustrated in FIG. 17) included in the registration process by the information processing apparatus 100 according to the embodiment of the present technology.

The control unit 150 of the information processing apparatus 100 displays the manufacturer selection screen (for example, the manufacturer selection screen 320 illustrated in the lower part of FIG. 8) on the display unit 110 (step S911). Subsequently, the control unit 150 determines whether a selection operation to select a manufacturer has been performed on the manufacturer selection screen (step S912). In a case where the selection operation to select a manufacturer has not been performed (step S912), monitoring is continued. Note that, in a case where the return operation has been performed, the instrument selection screen is displayed.

In a case where the selection operation to select a manufacturer has been performed (step S912), the control unit 150 controls the control signal control unit 140 to output a test signal (control signal) from the control signal output unit 130 (step S913). In this case, as illustrated in the upper part of FIG. 9, the test signal may be output on condition that a predetermined operation (for example, a pressing operation for the power button 331) is performed.

Subsequently, the control unit 150 determines whether there has been a response from the instrument (step S914). For example, as illustrated in the middle part of FIG. 9, the control unit 150 can determine whether there has been a response on the basis of the user operation. In a case where there has been no response from the instrument (step S914), the control unit 150 controls the control signal control unit 140 to output another test signal (control signal) from the control signal output unit 130 (step S913).

In a case where there has been a response from the instrument (step S914), the control unit 150 determines whether an instrument is to be additionally registered continuously (step S915). For example, as illustrated in the lower part of FIG. 9, the control unit 150 can determine whether the registration is continued on the basis of the user operation. In a case where an instrument is to be additionally registered continuously (step S915), the process returns to step S904 illustrated in FIG. 17. In a case where an instrument is not to be additionally registered continuously (step S915), the control unit 150 displays the remote controller list screen (home screen) on the display unit 110 (step S916).

[Action Example of Custom Remote Controller Creation Process]

Figure 19:
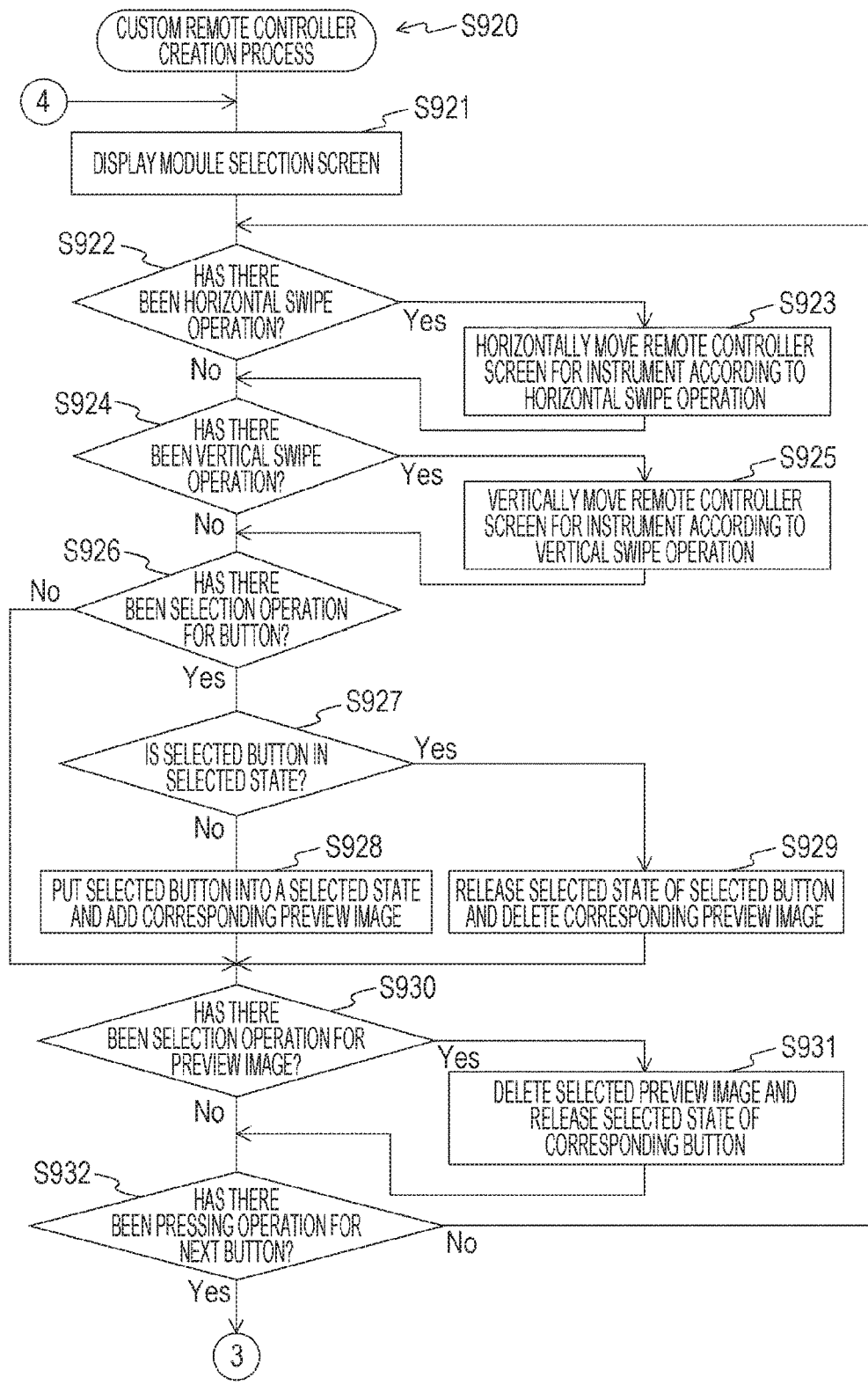
FIG. 19 is a flowchart illustrating an example of the process procedure of a custom remote controller creation process included in the registration process by the information processing apparatus 100 according to the embodiment of the present technology.
Figure 20:
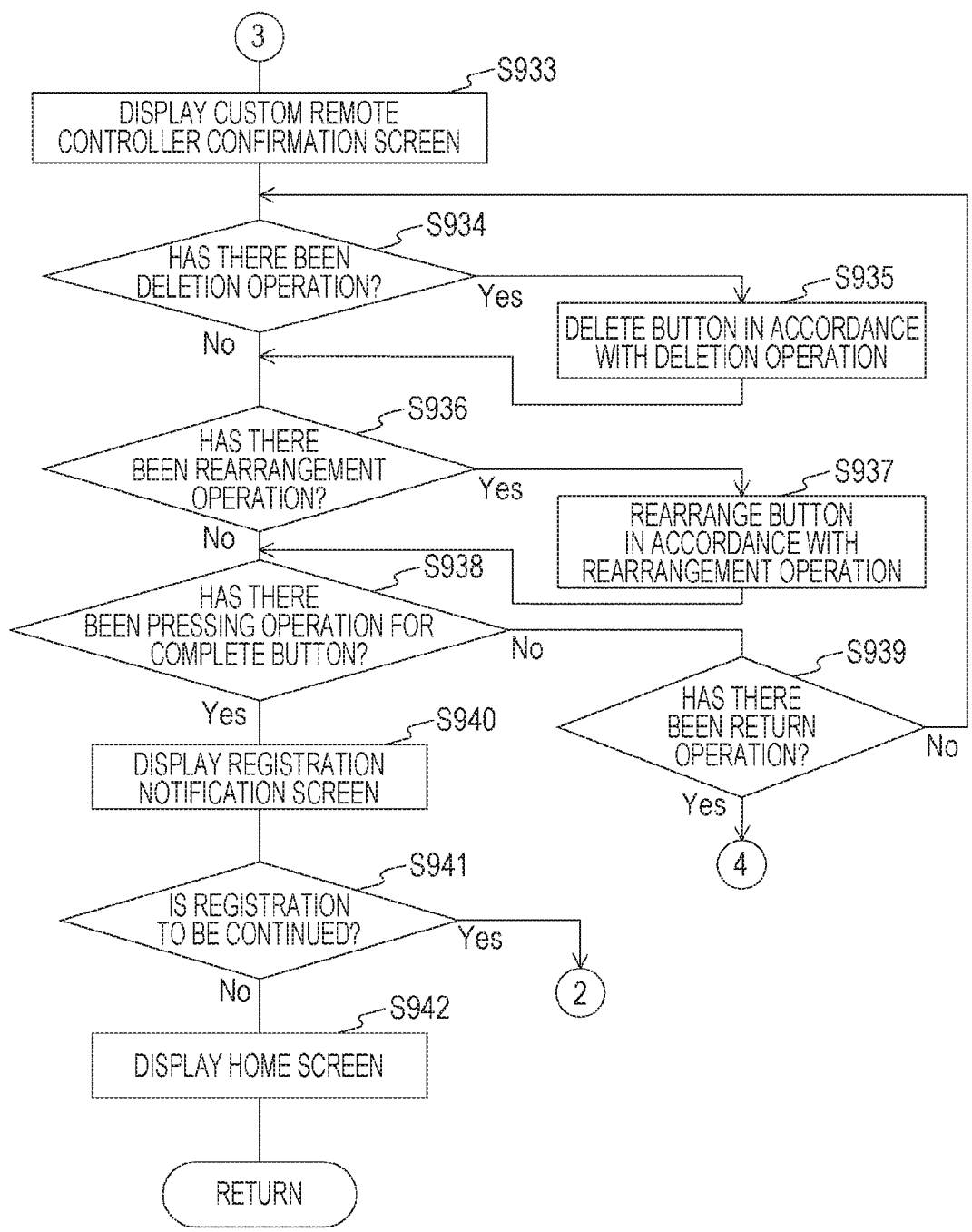
FIG. 20 is a flowchart illustrating an example of the process procedure of the custom remote controller creation process included in the registration process by the information processing apparatus 100 according to the embodiment of the present technology.

FIGS. 19 and 20 are flowcharts illustrating an example of the process procedure of the custom remote controller creation process (step S920 illustrated in FIG. 17) included in the registration process by the information processing apparatus 100 according to the embodiment of the present technology.

The control unit 150 of the information processing apparatus 100 displays the module selection screen (for example, the module selection screen 420 illustrated in the lower part of FIG. 11) on the display unit 110 (step S921). Subsequently, the control unit 150 determines whether a horizontal swipe operation has been performed on the module selection screen (step S922).

In a case where the horizontal swipe operation has been performed (step S922), the control unit 150 moves the remote controller screen for an instrument in the horizontal direction according to this horizontal swipe operation (step S923). For example, as illustrated in the middle part of FIG. 13, in a case where the horizontal swipe operation (indicated by the arrow 502) has been performed on the module selection screen 420, the display is switched from the second page 440 of the television remote controller screen to the first page 450 of the air conditioner remote controller screen.

In a case where the horizontal swipe operation has not been performed (step S922), the control unit 150 determines whether a vertical swipe operation has been performed on the module selection screen (step S924).

In a case where the vertical swipe operation has been performed (step S924), the control unit 150 moves the remote controller screen for an instrument in the vertical direction according to this vertical swipe operation (step S925). For example, as illustrated in the middle part of FIG. 12, in a case where the vertical swipe operation (indicated by the arrow 501) has been performed on the module selection screen 420, the display is switched from the first page 430 to the second page 440 of the television remote controller screen.

In a case where the vertical swipe operation has not been performed (step S924), the control unit 150 determines whether a selection operation for a button (module) has been performed on the module selection screen (step S926).

In a case where the selection operation for a button has been performed on the module selection screen (step S926), the control unit 150 determines whether this button for which the selection operation has been performed is in a selected state (step S927). In a case where the button for which the selection operation has been performed is not in a selected state (step S927), the control unit 150 puts the button into a selected state and displays the preview image corresponding to the button in the preview image display region (step S928). For example, as illustrated in the upper part of FIG. 12, in a case where the selection operation for the "GUIDE" button 431 has been performed, the button 431 is put into a selected state and the preview image 423 corresponding to the button is displayed in the preview image display region 421. Furthermore, the mark 422 is moved downward and displayed in the preview image display region 421.

In a case where the button for which the selection operation has been performed is in a selected state (step S927), the control unit 150 releases the selected state of the button and deletes the preview image corresponding to the button from the preview image display region (step S929).

Subsequently, the control unit 150 determines whether a selection operation for a preview image has been performed in the preview image display region on the module selection screen (step S930). In a case where the selection operation for a preview image has been performed (step S930), the control unit 150 deletes this preview image for which the selection operation has been performed and releases the selected state of the button corresponding to this preview image (step S931). For example, as illustrated in the upper part of FIG. 13, in a case where the selection operation for the preview image 424 has been performed, the preview image 424 is deleted and the selected state of the button corresponding to this preview image is released. Note that steps S921 to S931 are an example of a control procedure described in the claims.

In a case where the selection operation for a preview image has not been performed (step S930), the control unit 150 determines whether a pressing operation for the Next button has been performed (step S932). In a case where a pressing operation for the Next button has not been performed (step S932), the process returns to step S922.

In a case where a pressing operation for the Next button has been performed (step S932), the control unit 150 displays the custom remote controller confirmation screen on the display unit 110 (step S933).

Subsequently, the control unit 150 determines whether a deletion operation has been performed (step S934). In a case where the deletion operation has been performed (step S934), the control unit 150 deletes a button for which this deletion operation has been performed (step S935).

Subsequently, the control unit 150 determines whether a rearrangement operation has been performed (step S936). In a case where the rearrangement operation has been performed (step S936), the control unit 150 rearranges a button in accordance with this rearrangement operation (step S937).

Subsequently, the control unit 150 determines whether a pressing operation for the Complete button has been performed (step S938). In a case where the pressing operation for the Complete button has not been performed (step S938), the control unit 150 determines whether a return operation has been performed (step S939). Then, in a case where the return operation has been performed (step S939), the process returns to step S921. Meanwhile, in a case where the return operation has not been performed (step S939), the process returns to step S934.

In a case where a pressing operation for the Complete button has been performed (step S938), the control unit 150 displays the registration notification screen on the display unit 110 (step S940). Subsequently, the control unit 150 determines whether the custom remote controller screen is to be additionally registered continuously (step S941). In a case where the custom remote controller screen is to be additionally registered continuously (step S915), the process returns to step S904 illustrated in FIG. 17. In a case where the custom remote controller screen is not to be additionally registered continuously (step S941), the control unit 150 displays the remote controller list screen (home screen) on the display unit 110 (step S942).

As described thus far, the user can perform an operation of editing a plurality of operation buttons (operation elements) placed on a remote controller screen (operation screen) for operating one or a plurality of electronic instruments to place a desired operation button (operation element) on the custom remote controller screen (edit screen). In a case where this editing is performed, the control unit 150 of the information processing apparatus 100 displays the remote controller screen (operation screen) on the module selection screen (display surface) of the display unit 110. In addition, the control unit 150 displays a part of an image (preview image) indicating a placement location on the custom remote controller screen (edit screen) of the operation button (operation element) on a part of the display surface (the preview image display region on the module selection screen). In this case, the control unit 150 displays the plurality of operation buttons placed on the remote controller screen in sequence in a predetermined direction (for example, the up-down direction). Furthermore, the control unit 150 displays the preview image in a display region (preview image display region) adjacent to the remote controller screen in an orthogonal direction (for example, a left-right direction) orthogonal to the predetermined direction. Additionally, the control unit 150 can delete or replace the operation button on the custom remote controller screen on the basis of the deletion operation or a replacement operation for the preview image displayed in the preview image display region.

In addition, the control unit 150 can adjust the size (for example, the length) in the predetermined direction of the preview image displayed in the preview image display region to the same size or substantially the same size as the size in the predetermined direction of the operation button corresponding to this preview image placed on the remote controller screen.

In addition, the control unit 150 can display an image indicating the degree of occupancy of the operation button in the predetermined direction on the custom remote controller screen as the preview image.

In addition, when receiving selection operations to select the operation buttons placed on the remote controller screen displayed on the module selection screen, the control unit 150 can display the preview images of these selected operation buttons in sequence in the preview image display region in accordance with the selection order. Furthermore, the control unit 150 can display a mark representing a position where the preview image is to be placed next in the preview image display region on the module selection screen.

In addition, the control unit 150 can assign the same identification information to the preview image displayed in the preview image display region and the operation button corresponding to this preview image placed on the remote controller screen displayed on the module selection screen.

As described above, according to the embodiment of the present technology, it is possible to implement a user interface that is easy for the user to see on a limited display. That is, in a case where a visual element (operation button) having a vertical width and a horizontal width is selected and ordered on a limited display to create a new custom remote controller screen, a user interface easy for the user to see can be implemented. Specifically, on a limited display, the user can easily preview how ordered visual elements (operation buttons) are placed after the selection on the same screen as that used to select the visual elements.

In this manner, by simultaneously displaying the preview images when the visual elements (operation buttons) are sorted, it is possible to implement a graphical user interface (GUI) with which the user can easily grasp the placement of the operation buttons. That is, a user interface that is easy to customize can be provided.

In addition, in the embodiment of the present technology, a region for selecting a button to be placed (the remote controller screen for each instrument) is ensured widely and a small portion of a UI (preview image display region) indicating a region occupied by the already selected button is solely presented. With this configuration, a wide space used by the user during operation can be ensured to improve the operability. In addition, it is possible to easily grasp the ratio of the already selected button in one screen while saving space on the display surface. With this configuration, it is possible to allow the user to visually grasp how much more buttons can be selected to accommodate in one screen with ease.

Note that, in the embodiments of the present technology, the information processing apparatus capable of operating another electronic instrument using infrared light has been described as an example. However, the present technology can be applied also to an information processing apparatus (electronic instrument) capable of operating another electronic instrument using other wireless communication. For example, a wireless local area network (LAN) (for example, Wireless Fidelity (Wi-Fi)) or Bluetooth (registered trademark) can be used as other wireless communication.

Note that the above-described embodiments illustrate examples for embodying the present technology and matters in the embodiments and invention specifying matters in the claims individually have correspondence relationships. Likewise, the invention specifying matters in the claims and the matters in the embodiments of the present technology denoted by the same names as those in the claims individually have correspondence relationships. However, the present technology is not limited to the embodiments and can be embodied by subjecting the embodiments to various modifications without departing from the gist thereof.

In addition, the process procedures described in the above embodiments may be regarded as a method having these series of procedures and additionally, may be regarded as a program for causing a computer to execute these series of procedures or as a recording medium storing the program. As this recording medium, for example, a compact disc (CD), a mini disc (MD), a digital versatile disc (DVD), a memory card, or a Blu-ray (registered trademark) disc can be used.

Note that the effects described in the present description merely serve as examples and not construed to be limited. There may be another effect as well.

Note that the present technology can be also configured as described below.

(1)

An information processing apparatus including a control unit that, in a case where an operation of editing a plurality of operation elements placed on an operation screen is performed to place each operation element on an edit screen, displays the operation screen on a display surface of a display unit and also displays a part of an image indicating a placement location on the edit screen of each operation element on the display surface.

(2)

The information processing apparatus according to (1) above, in which the control unit displays the plurality of operation elements placed on the operation screen in sequence in a predetermined direction and displays a part of the image indicating the placement location in a display region adjacent to the operation screen in an orthogonal direction orthogonal to the predetermined direction.

(3)

The information processing apparatus according to (2) above, in which the control unit adjusts a size in the predetermined direction of the image indicating the placement location displayed in the display region to the same size or substantially the same size as a size in the predetermined direction of an operation element corresponding to the image indicating the placement location, from among the plurality of operation elements placed on the operation screen.

(4)

The information processing apparatus according to (2) or (3) above, in which the control unit displays an image indicating the degree of occupancy of each operation element on the edit screen in the predetermined direction as a part of the image indicating the placement location.

(5)

The information processing apparatus according to any one of (1) to (4) above, in which, when receiving selection operations to select the operation elements placed on the operation screen displayed on the display surface, the control unit displays parts of images indicating the placement locations of the selected operation elements in sequence on the display surface in accordance with a selection order.

(6)

The information processing apparatus according to (5) above, in which the control unit displays a mark representing a position where a part of the image indicating the placement location is to be placed next in the display region displaying a part of the image indicating the placement location on the display surface.

(7)

The information processing apparatus according to any one of (1) to (6) above, in which the control unit assigns the same identification information to a part of the image indicating the placement location displayed on the display surface and an operation element corresponding to the image indicating the placement location among the plurality of operation elements placed on the operation screen displayed on the display surface.

(8)

The information processing apparatus according to any one of (1) to (7) above, in which the control unit deletes or replaces each operation element on the edit screen on the basis of a deletion operation or a replacement operation for a part of the image indicating the placement location displayed on the display surface.

(9)

The information processing apparatus according to any one of (1) to (8) above, in which the control unit places an operation element selected on the basis of a user operation on the edit screen, from among the plurality of operation elements placed on the operation screen.

(10)

The information processing apparatus according to any one of (1) to (9) above, in which the operation screen includes a plurality of operation screens for operating another electronic instrument using wireless communication on which the operation elements are placed, and the control unit displays at least one operation screen on the display surface on the basis of a user operation, from among the plurality of operation screens.

(11)

The information processing apparatus according to any one of (1) to (10) above, in which the information processing apparatus is an information processing apparatus including the display unit whose display surface has a size equal to or smaller than a predetermined size, or an information processing apparatus of a size that allows a user to hold the entire apparatus with one hand.

(12)

An information processing method including a control procedure of, in a case where an operation of editing a plurality of operation elements placed on an operation screen is performed to place each operation element on an edit screen, displaying the operation screen on a display surface of a display unit and also displaying a part of an image indicating a placement location on the edit screen of each operation element on the display surface.

(13)

A program that causes a computer to execute a control procedure of, in a case where an operation of editing a plurality of operation elements placed on an operation screen is performed to place each operation element on an edit screen, displaying the operation screen on a display surface of a display unit and also displaying a part of an image indicating a placement location on the edit screen of each operation element on the display surface.

REFERENCE SIGNS LIST

100 Information processing apparatus
110 Display unit
120 Operation reception unit
130 Control signal output unit
140 Control signal control unit
150 Control unit
160 Battery
170 Storage unit
180 External storage unit

The invention claimed is:

1. An information processing apparatus, comprising:
a display unit configured to display a module selection screen; and
a control unit configured to:
control the display unit to display an operation screen on the module selection screen, wherein the operation screen includes a plurality of operation elements;
control an edit operation on the plurality of operation elements of the operation screen;
control the display unit to display a plurality of images on the module selection screen based on the edit operation on plurality of operation elements; and
control the display unit to display an edit screen based on the edit operation on plurality of operation elements, wherein
the edit screen includes the plurality of operation elements,
a part of each of the plurality of images represents placement information of a corresponding operation element of the plurality of operation elements, and
the placement information of the part of each of the plurality of images indicates a placement location of the corresponding operation element on the edit screen.

2. The information processing apparatus according to claim 1, wherein the control unit is further configured to:
control the display unit to display the plurality of operation elements in a sequence, wherein the sequence is in a specific direction; and
control the display unit to display the part of each of the plurality of images in a display region of the module selection screen, wherein the display region is adjacent to the operation screen in an orthogonal direction orthogonal to the specific direction.

3. The information processing apparatus according to claim 2, wherein
the control unit is further configured to adjust a size of each image of the plurality of images based on a size of the corresponding operation element in the specific direction,
the size of each image of the plurality of images is adjusted in the specific direction, and
the size of each image of the plurality of images is one of same or substantially same as the size of the corresponding operation element.

4. The information processing apparatus according to claim 2, wherein
the control unit is further configured to control the display unit to display a specific image of each of the plurality of images on the module selection screen,
the specific image of each of the plurality of images indicates a degree of occupancy of the corresponding operation element on the edit screen, and
the specific image of each of the plurality of images is displayed as a corresponding part of each of the plurality of images.

5. The information processing apparatus according to claim 1, wherein the control unit is further configured to:
receive an input to select the plurality of operation elements on the operation screen; and
control the display unit to display the part of each of the plurality of images in a sequence,
wherein the sequence is based on an order of the selection of the plurality of operation elements.

6. The information processing apparatus according to claim 5, wherein
the control unit is further configured to control the display unit to display a mark in a display region of the module selection screen,
the mark represents a position where a first part of a first image of the plurality of images next to a second part of a second image of the plurality of images.

7. The information processing apparatus according to claim 1, wherein the control unit is further configured to:
assign same identification information to the corresponding operation element and a corresponding part of each of the plurality of images.

8. The information processing apparatus according to claim 1, wherein the control unit is further configured to one of delete or replace at least one operation element of the plurality of operation elements on the edit screen based on one of a deletion operation or a replacement operation for the part of at least one of the plurality of images on the module selection screen.

9. The information processing apparatus according to claim 1, wherein the control unit is further configured to:
select at least one operation element from the plurality of operation elements on the operation screen based on a user operation; and
control the display unit to display the at least one operation element on the edit screen.

10. The information processing apparatus according to claim 1, wherein
the operation screen includes a plurality of sub-screens to operate an electronic instrument via wireless communication, and the control unit is further configured to control the display unit to display at least one sub-screen of the plurality of sub-screens on the module selection screen based on a user operation.

11. The information processing apparatus according to claim 1, wherein one of
a size of the module selection screen is equal to or smaller than a threshold size, or
a size of the information processing apparatus is a specific size.

12. An information processing method, comprising:
   displaying an operation screen on a module selection screen,
      wherein the operation screen includes a plurality of operation elements;
   controlling an editing operation on the plurality of operation elements on the operation screen;
   displaying a plurality of images on the module selection screen based on the editing operation on the plurality of operation elements; and
   displaying an edit screen based on the editing operation on the plurality of operation elements, wherein
      the edit screen includes the plurality of operation elements,
      a part of each of the plurality of images represents placement information of a corresponding operation element of the plurality of operation elements, and
      the placement information of the part of each of the plurality of images indicates a placement location of the corresponding operation element on the edit screen.

13. A non-transitory computer-readable medium having stored thereon computer-readable instructions, which when executed by a computer, cause the computer to execute operations, the operations comprising:
   controlling a display unit to display an operation screen on a module selection screen,
      wherein the operation screen includes a plurality of operation elements;
   controlling an editing operation on the plurality of operation elements on the operation screen;
   controlling the display unit to display a plurality of images on the module selection screen based on the editing operation on the plurality of operation elements; and
   controlling the display unit to display an edit screen based on the editing operation on the plurality of operation elements, wherein
      the edit screen includes the plurality of operation elements,
      a part of each of the plurality of images represents placement information of a corresponding operation element of the plurality of operation elements, and
      the placement information indicates a placement location of the corresponding operation element on the edit screen.

* * * * *